US008731483B2

(12) United States Patent
Holter

(10) Patent No.: US 8,731,483 B2
(45) Date of Patent: May 20, 2014

(54) ARRAY ANTENNA SYSTEM

(75) Inventor: Henrik Holter, Saltsjö-Boo (SE)

(73) Assignee: SAAB AB, Linköping (SE)

( * ) Notice: Subject to any disclaimer, the term of this patent is extended or adjusted under 35 U.S.C. 154(b) by 181 days.

(21) Appl. No.: 13/511,901

(22) PCT Filed: Nov. 25, 2009

(86) PCT No.: PCT/SE2009/051338
§ 371 (c)(1),
(2), (4) Date: May 24, 2012

(87) PCT Pub. No.: WO2011/065876
PCT Pub. Date: Jun. 3, 2011

(65) Prior Publication Data

US 2012/0289172 A1 Nov. 15, 2012

(51) Int. Cl.
*H04B 1/44* (2006.01)

(52) U.S. Cl.
USPC .............. 455/78; 455/562.1; 455/39; 455/91; 455/130

(58) Field of Classification Search
CPC ..... H01Q 21/00; H01Q 21/01; H01Q 5/0006; H04B 1/00
USPC ..................... 455/78, 562.1, 91, 103, 130, 39
See application file for complete search history.

(56) References Cited

U.S. PATENT DOCUMENTS

2003/0083016 A1* 5/2003 Evans et al. .................. 455/67.1
2009/0117859 A1* 5/2009 Smith et al. ..................... 455/78
2009/0130992 A1 5/2009 Ganwani et al.
2010/0248651 A1* 9/2010 Dent ............................... 455/78

OTHER PUBLICATIONS

PCT/ISA/210—International Search Report—Jul. 29, 2010.
PCT/ISA/237—Written Opinion of the International Searching Authority—Jul. 29, 2010.

* cited by examiner

*Primary Examiner* — Tuan Pham
(74) *Attorney, Agent, or Firm* — Venable LLP; Eric J. Franklin

(57) ABSTRACT

A method for an antenna system including a transmitting phase array antenna including a transmitting antenna subarray including a number of antenna elements transmitting on a first frequency and a receiving phase array antenna including a receiving antenna subarray including a number of antenna elements. The transmitting antenna subarray antenna is positioned at a distance relative the receiving antenna subarray antenna and the coupling between two antenna subarrays are decided and used for controlling the transmitting subarray antenna to transmit in such a way that there will be nulling of the energy in the receiving antenna subarray antenna with respect to the transmitting antenna subarray.

5 Claims, 21 Drawing Sheets

ARRAY ANTENNA SYSTEM

CROSS-REFERENCE TO RELATED APPLICATIONS

This is the national phase under 35 U.S.C. §371 of PCT/SE2009/051338 filed 25 Nov. 2009.

TECHNICAL FIELD

The invention refers to a method for an antenna system comprising a transmitting phase array antenna comprising a transmitting antenna subarray comprising a number Q antenna elements transmitting on a first frequency and a receiving phase array antenna comprising a receiving antenna subarray comprising a number P antenna elements. The transmitting antenna subarray antenna is positioned at a distance relative the receiving antenna subarray antenna. The transmitting antenna subarray antenna transmits a first signal at a first time period and the receiving antenna subarray antenna receives the first signal at least partly within the first time period causing a coupling between the transmitting antenna subarray antenna and the receiving antenna subarray antenna.

BACKGROUND ART

In today's antenna system comprising a transmitting array antenna and a receiving array antenna, there is coupling between the transmitting antenna and the receiving antenna when they are used at the same time. This is a problem since the transmitting antenna could be too "loud" for a receiving antenna. In prior art the problem with coupling have been solved by introduction of physical obstacles such as walls, etc.

Coupling between subarrays in an array antenna may constitute a major problem since a transmitting antenna subarray may make another subarray for receive more or less useless because of interference.

Reduction of the subarray coupling is not an easy task. The large bandwidth of broadband array antennas is a result of strong element coupling.

The possibility to use existing adaptive beam-forming techniques to reduce the coupling is known in far field pattern, but the previously known technique do not reduce the subarray coupling.

The conclusion is that traditional adaptive beam-forming techniques are not appropriate for reduction of subarray coupling.

SUMMARY

In view of prior art there still exists a need for an antenna system, comprising a transmitting array antenna and a receiving array antenna, where the mutual coupling between subarrays within a combined transmitting and receiving array antenna or between a transmitting array antenna and a receiving array antenna are nullified or at least reduced. The Invention refers to a method where a transmitting antenna uses adaptive beam-forming functions with a constraint based on the knowledge of coupling between the antenna elements in the transmitting antenna and the receiving antenna, where a scattering matrix between the transmitting antenna and the receiving antenna is used. The scattering matrix comprises a coupling coefficient between each antenna element in the transmitting antenna and each antenna element in the receiving antenna element.

In the description of the invention the transmitting array antenna is described as a transmitting antenna subarray antenna and the receiving antenna is described as a receiving antenna subarray antenna, since the invention refers to an antenna system comprising a transmitting antenna and a receiving antenna regardless of whether if they are comprised in a combination array antenna or whether if they are two separate units.

The scattering matrix is thus used as constraint in an equation to modify a quiescent excitation $x_0$ in the transmitting antenna subarray antenna in order to get nulls at the elements in the receiving antenna subarray antenna by controlling the elements in the transmitting antenna subarray antenna to transmit a signal that nullifies the coupling energy in the receiving antenna subarray antenna.

Hence, the invention refers to a new method for subarray coupling reduction.

The invention refers to nullifying transmitted energy from a transmitting antenna in an area connected to a receiving antenna.

The position of each antenna element in the transmitting antenna subarray antenna relative each element in the receiving antenna subarray antenna is not important per se since according to one example, the coupling can be measured without knowledge of the position in order to create the scattering matrix. However, if the position is changed after the measurement, a new measurement has to be done in order to create a new scattering matrix. Hence, the position must be fixed for each measurement. If the relative position and thus distance is known, it is possible to calculate the scattering matrix. The measurement has the advantage over the calculation that it becomes more precise and that reflections in surrounding structures will be part of the measurement. Both the measurement and the calculation techniques are known from prior art.

The invention refers to a mathematical algorithm that calculates how the transmitting antenna shall use the apertures in order to create the nullified area(s) in the transmitting pattern at the receiving antenna.

The method can dynamically shift the nullifying pattern in order to cover different receiving antennas at different points in time.

A coupling matrix must be determined for use in the algorithm. The coupling matrix can be decided using measurements or calculation. Measurement in situ is preferable since reflections from the surrounding structure will then inherently be part of the coupling matrix.

The invention can be used on both group antennas of multifunction type and on a number of separated group antennas.

The invention has the following advantages:

The method gives a better performance of an already existing group antenna used for both transmitting and receiving.

The method is forceful and simple to implement since there is only calculations on already existing devices.

The method has very little impact on the radiation diagram of the transmitting antenna.

No extra hardware is needed. The already existing functions, in the group antenna, regarding control of amplitude and phase are used. The control of amplitude and phase for the different elements in the antenna system for beam forming purposes is well known in the prior art.

The method gives increased antenna performance.

The method gives increased field of application of array antennas.

The invention can be used in all type of phased array antennas where the coupling between subarrays within multifunction array antennas or between array antennas needs to be reduced The invention relies on the possibility to detect or calculate the coupling between the subarray of the transmitting antenna and the subarray of the receiving antenna and to use the scattering matrix between the subarrays as a constraint with an antenna pattern synthesis method, in order to reduce the coupling. A constraint with the least mean square pattern synthesis method is used in the invention.

One example on how to use the constraint is the least mean square pattern synthesis method as described below, but other solutions could be possible with another method for solving a problem aiming to modify the quiescent excitation in the transmitting antenna subarray in order to get nulls at the elements in the receiving antenna subarray.

In order to explain the invention further an example will be described below where the antenna system is one of many possibilities, but where the calculations can be used on all the possible antenna system referring to the invention, i.e. a transmitting array antenna and a receiving array antenna where the coupling from the transmitting antenna to the receiving antenna needs to be reduced.

The example refers to an array where the antenna elements are arranged in a planar rectangular lattice with element spacing d in both spatial directions and is used in the derivation of the method according to the invention. The final result that shows how to modify the array excitation coefficients is valid for any type of planar or non-planar array lattice.

Assume that a transmitting antenna subarray TX is used as a transmitting antenna and that a receiving antenna subarray RX is used as the receiving antenna. The goal is to reduce the coupling from the transmitting antenna subarray TX to the receiving antenna subarray RX with as little effect as possible on the transmitting antenna subarray TX far-field pattern. The transmitting antenna subarray TX far-field pattern is described by the array factor $$F = \sum_m \sum_n x_{mn} e^{-jkd(mu+nv)} \tag{1}$$

$$k = 2\pi/\lambda$$

$$u = \sin\theta\cos\varphi$$

$$v = \sin\theta\sin\varphi,$$

Where $x_{mn}$ (x in vector form) is the complex excitation of element (m, n) in transmitting antenna subarray TX, d is the element spacing, k is the wavenumber, λ is the wavelength and (θ,φ) is the direction in space in spherical coordinates. The array normal direction is given by θ=0 degrees.

Let $F_0$ be the quiescent pattern of the transmitting antenna subarray obtained when no constraints regarding nulls in receiving antenna subarray RX have been applied $$F_0 = \sum_m \sum_n x_{0mn} e^{-jkd(mu+nv)}, \tag{2}$$

where $x_{0mn}$ ($x_0$ in vector form) is the corresponding quiescent excitation.

Let $F_a$ be the approximate pattern obtained when constraints regarding nulls have been applied $$F_a = \sum_m \sum_n x_{amn} e^{-jkd(mu+nv)}, \tag{3}$$

where $x_{amn}$ ($x_a$ in vector form) is the corresponding excitation. Let $F_a$ be the closest approximation, in the least mean square sense, to the quiescent pattern $F_0$.

The coupling, b, from the elements in transmitting antenna subarray TX to the elements in receiving antenna subarray RX is $$b = S_{BA}x, \tag{4}$$

where $S_{BA}$ is the scattering-matrix with the transmitting antenna subarray TX to receiving antenna subarray RX mutual coupling coefficients. $S_{BA}$ is a P×Q matrix, where P and Q is the number of elements in receiving antenna subarray RX and transmitting antenna subarray TX respectively.

The synthesis problem can then be stated as: find the approximate pattern $F_a$ such that the mean square difference $$\varepsilon(F_a) = \frac{d^2}{\lambda^2} \int_{-\frac{\lambda}{2d}}^{\frac{\lambda}{2d}} \int_{-\frac{\lambda}{2d}}^{\frac{\lambda}{2d}} |F_0(u, v) - F_a(u, v)|^2 \, dv\, du = \min, \tag{5}$$

subject to the constraint $$S_{BA}x_a = 0. \tag{6}$$

Parseval's identity on equation (5) gives $$\varepsilon(F_a) = \frac{d^2}{\lambda^2} \int_{-\frac{\lambda}{2d}}^{\frac{\lambda}{2d}} \int_{-\frac{\lambda}{2d}}^{\frac{\lambda}{2d}} |F_0(u, v) - F_a(u, v)|^2 \, dv\, du = \sum_m \sum_n |x_{0mn} - x_{amn}|^2 = (x_0 - x_a)^T(\overline{x}_0 - \overline{x}_a) = \|x_0 - x_a\|^2 = \varepsilon(x_a) \tag{7}$$

Where the horizontal bar symbol denote complex conjugate. Superscript T denotes transpose. Parseval's identity is known per se in prior art.

The synthesis problem now becomes $$\epsilon(x_a) = \|x_0 - x_a\|^2 = \min \tag{8}$$

$$g(x_a) = S_{BA}x_a = 0 \tag{9}$$

The solution to this optimization problem can be obtained by using "Lagrange's multipliers"

$$\frac{\partial}{\partial x_{ai}}\left(\varepsilon(x_a) + \sum_{j=1}^{P} \beta_j g_j(x_a)\right) = 0,\ i = 1 \ldots Q, \tag{10}$$

where β is a complex vector to be determined. Element index m, n has for simplicity been replaced by the single index i, j is the receiving antenna subarray RX element index. Lagrange's multipliers are known per se in prior art. Substitution of equation (8) and equation (9) in equation (10) gives $$\frac{\partial}{\partial x_{ai}}\left((x_0 - x_a)^T(\overline{x}_0 - \overline{x}_a) + \sum_{j=1}^{P} \beta_j S_{BA,row\,j} x_a\right) = \tag{11}$$

-continued $$\frac{\partial}{\partial x_{ai}}\left(x_0^T\overline{x}_0 - x_0^T\overline{x}_a - x_a^T\overline{x}_0 + x_a^T\overline{x}_a + \sum_{j=1}^{P}\beta_j S_{BA,row\ j}x_a\right) =$$

$$-\overline{x}_{0i} + \overline{x}_{ai} + \sum_{j=1}^{P}\beta_j S_{BA,ji} = -\overline{x}_{0i} + \overline{x}_{ai} + \beta^T S_{BA,column\ i} =$$

$$0 \Leftrightarrow -\overline{x}_0 + \overline{x}_a + (\beta^T S_{BA})^T = 0 \Leftrightarrow x_a = x_0 - S_{BA}^*\overline{\beta},$$

where superscript * denote conjugate transpose. $\overline{\beta}$ is determined from equation (9) and (11)

$$0=S_{BA}x_a=S_{BA}(x_0-S^*_{BA}\overline{\beta})=S_{BA}x_0-S_{BA}S^*_{BA}\overline{\beta}\Rightarrow$$

$$\overline{\beta}=(S_{BA}S^*_{BA})^{-1}S_{BA}x_0 \tag{12}$$

Substitution of equation (12) in equation (11) finally gives $$x_a=x_0-S^*_{BA}(S_{BA}S^*_{BA})^{-1}S_{BA}x_0=(I-S^*_{BA}(S_{BA}S^*_{BA})^{-1}S_{BA})x_0, \tag{13}$$

where l is the identity matrix. Equation (13) shows how to modify the quiescent excitation $x_0$ in transmitting antenna subarray TX in order to get nulls at the elements in the receiving antenna subarray RX.

Some of the properties of the method according to the invention are:

- It is used on the transmitting antenna subarray TX. The only information needed in order to use the method is the scattering matrix between the transmitting antenna subarray TX and the receiving antenna subarrays RX. Information about the excitation of the receiving antenna subarray RX is not needed. Since the method is used on the transmitting antenna subarray TX it does not affect beam-forming on the receiving antenna subarray RX.
- The term between the parentheses on the right hand side of equation (13) is independent of the array antenna scan direction and needs to be calculated only once for each frequency. The frequency independency is true if the coupling coefficients between the elements in the transmitting antenna subarray TX and the receiving antenna subarray RX do not change with time.
- The best way to determine the coupling coefficients from the transmitting antenna subarray TX to the receiving antenna subarray RX is probably to measure them when the array has been integrated since the coupling to the environment (radome etc) close to the array then will be included in the coupling coefficients. It may be possible to use the calibration function, if any, in the array to determine the coupling coefficients.
- If the number of elements in the transmitting antenna subarray TX and receiving antenna subarray RX is Q and P respectively then P<Q is a necessary condition since the number of free variables is Q.

BRIEF DESCRIPTION OF DRAWINGS

The invention will below be described in connection to a number of drawings, in which:

FIG. 10 schematically shows five different sized transmitting antenna subarrays TX relative a receiving antenna subarray Rx with fixed size, and in which;

EXAMPLES OF THE INVENTION

Figure 1:
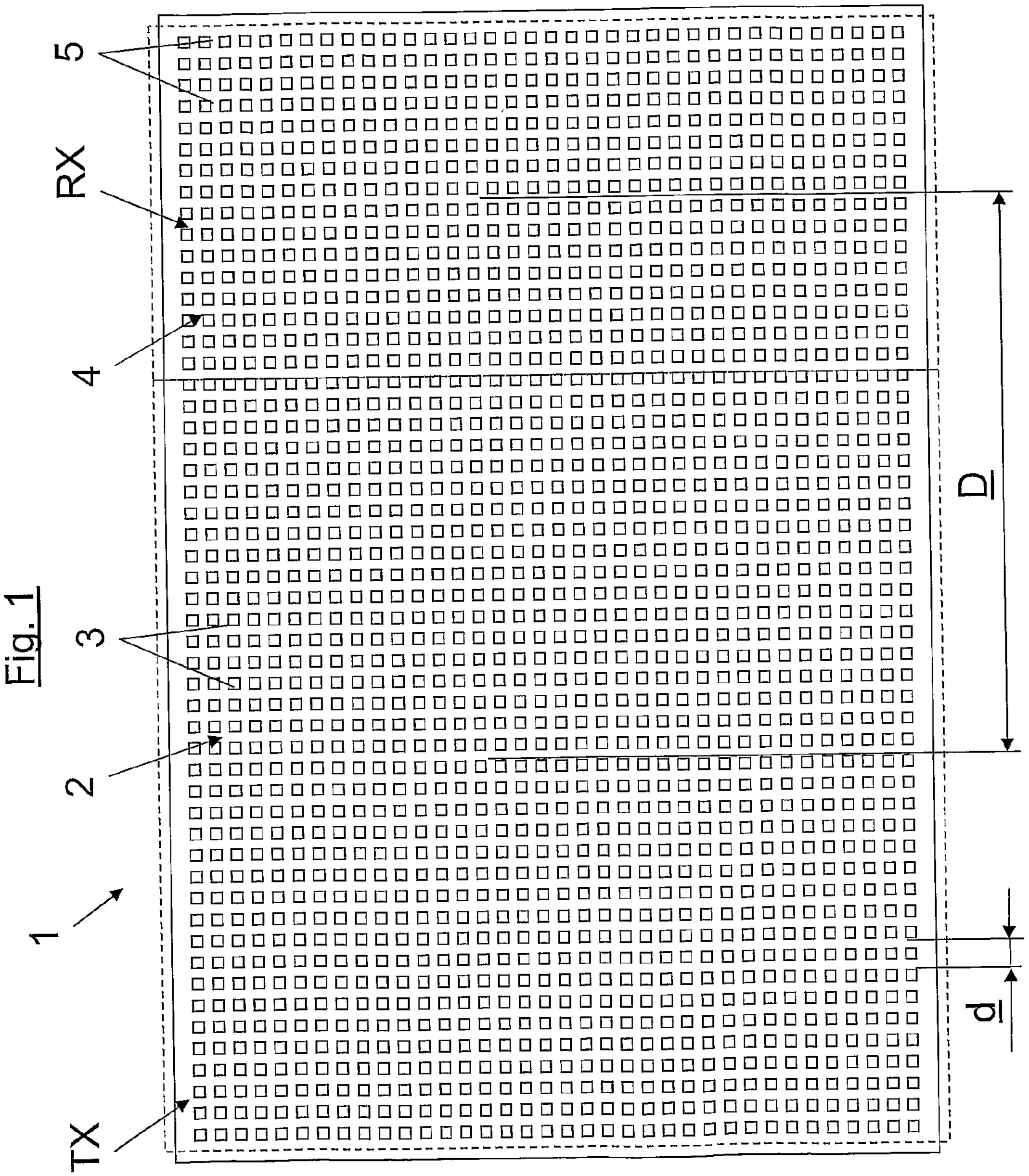
FIG. 1 schematically shows an antenna system comprising a combination array antenna according to the invention comprising a transmitting antenna subarray and a receiving antenna subarray.

FIG. 1 schematically shows an antenna system 1 comprising a combination array antenna according to the invention comprising a transmitting phase array antenna 2 comprising a transmitting antenna subarray TX comprising a number Q antenna elements 3 transmitting on a first frequency and a receiving phase array antenna 4 comprising a receiving antenna subarray RX comprising a number P antenna elements 5. The transmitting antenna subarray antenna TX is positioned at a centre distance D relative the receiving antenna subarray antenna RX. The transmitting antenna subarray antenna TX is arranged to transmit a first signal at a first time period and wherein the receiving antenna subarray antenna RX is arranged to receive the first signal at least partly within the first time period causing a coupling between the transmitting antenna subarray antenna TX and the receiving antenna subarray antenna RX.

The coupling between the antenna elements in the transmitting antenna subarray antenna TX and the antenna elements in the receiving antenna subarray antenna RX are measured or calculated and the coupling data is stored as a scattering-matrix $S_{BA}$ in a memory and that the scattering matrix $S_{BA}$ is then used in an equation (13) to modify a quiescent excitation $x_0$ in the transmitting antenna subarray TX in order to get nulls at the elements in receiving antenna subarray RX by controlling the elements in the transmitting antenna subarray antenna (TX) to transmit a signal that nullifies the coupling energy in the receiving antenna subarray antenna RX. The calculation is advantageously made by a machine, for example a computer, and the transmitting antenna is controlled by any suitable control means that can control the antenna elements 3 in the transmitting antenna subarray.

In FIG. 1 the antenna transmitting antenna subarray TX and the receiving antenna subarray RX are positioned in a combination antenna being essentially flat. However any shape is possible for the antenna transmitting antenna subarray TX and the receiving antenna subarray RX.

Figure 2:
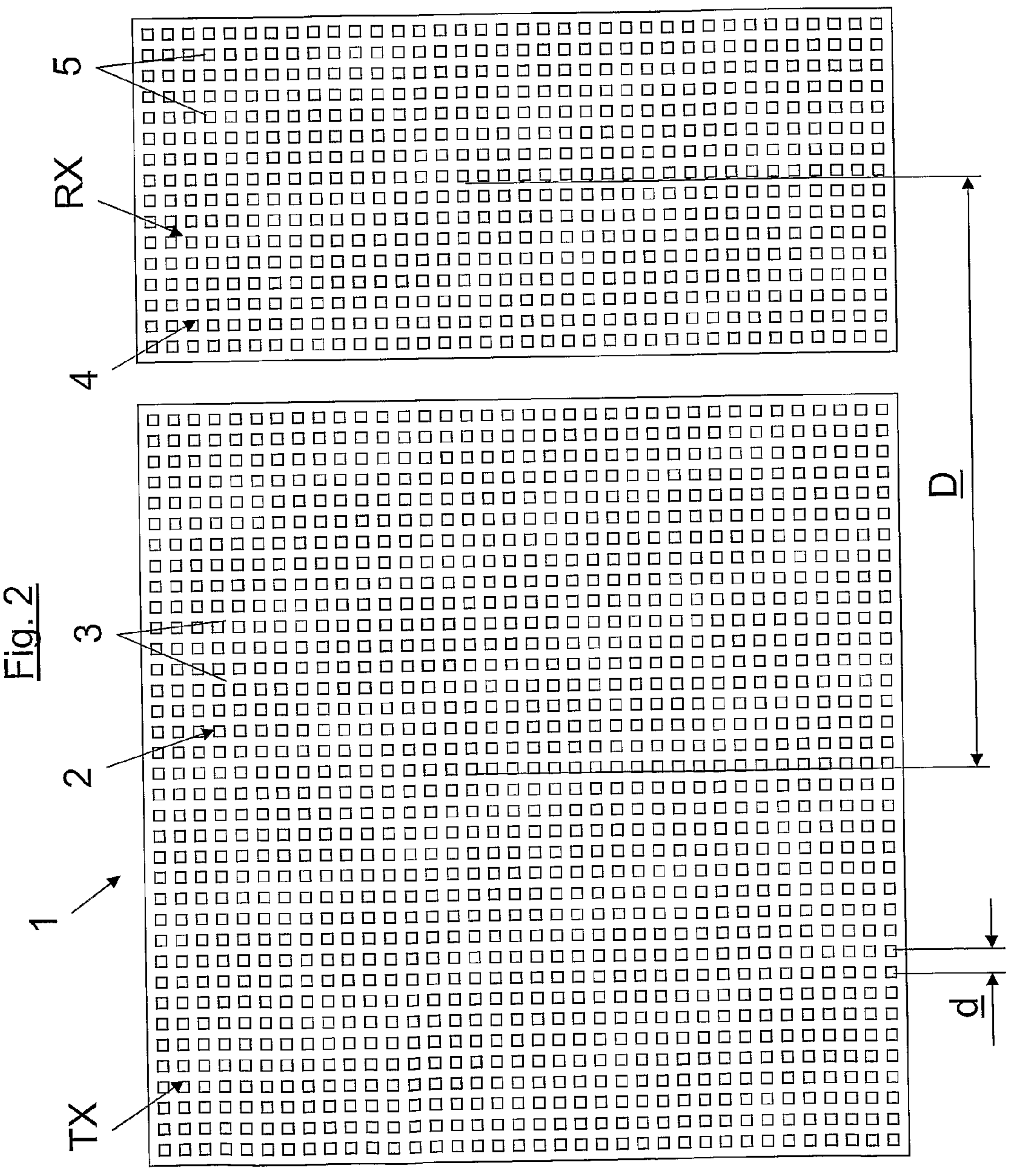
FIG. 2 schematically shows an antenna system according to the invention comprising a separate transmitting antenna subarray and a separate receiving antenna subarray facing essentially in the same direction.

FIG. 2 schematically shows an antenna system according to the invention comprising a separate transmitting antenna subarray TX and a separate receiving antenna subarray RX facing essentially in the same direction. The difference between the system in FIG. 1 and the system in FIG. 2 is the relative position of the transmitting antenna subarray TX and the receiving antenna subarray RX. The described and below described method could be applied on both system by measuring or calculating the coupling matrix.

Figure 3:
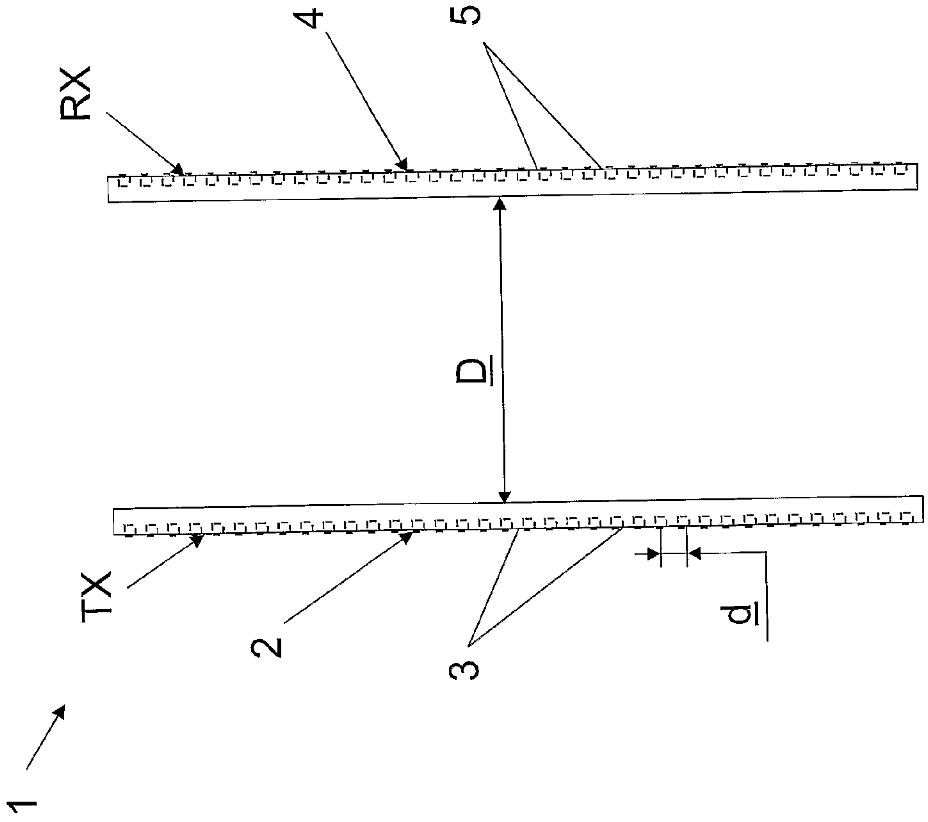
FIG. 3 schematically shows an antenna system according to the invention comprising a separate transmitting antenna subarray and a separate receiving antenna subarray facing essentially in the opposite directions.

FIG. 3 schematically shows an antenna system according to the invention comprising a separate transmitting antenna subarray and a separate receiving antenna subarray facing essentially in the opposite directions. The difference between the system in FIG. 1 and the system in FIG. 3 is the relative position of the transmitting antenna subarray TX and the receiving antenna subarray RX. The described and below described method could be applied on both system by measuring or calculating the coupling matrix.

Figure 4:
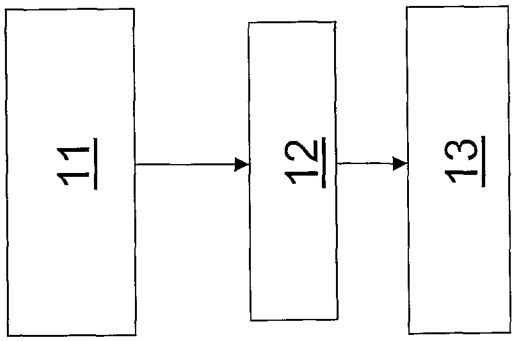
FIG. 4 schematically shows a flow chart of the method according the invention.

FIG. 4 schematically shows a flow chart of the method according the invention.

Box 11 shows that a scattering matrix is created by either measuring the coupling between each element in the transmitting antenna subarray TX and each element in the receiving antenna subarray RX, or by measuring the distance between each element in the transmitting antenna subarray TX and each element in the receiving antenna subarray antenna RX and using knowledge about material and geometrical features of the transmitting antenna subarray TX and the receiving antenna subarray RX, and then calculating the coupling and creating the scattering matrix.

Box 12 shows that the following calculations are made:

a modification of a quiescent excitation $x_0$ in transmitting antenna subarray TX is calculated by the following steps:

a transmitting antenna subarray TX far-field pattern is described by the array factor $$F = \sum_m \sum_n x_{mn} e^{-jkd(mu+nv)} \tag{1}$$

$$k = 2\pi/\lambda$$

$$u = \sin\theta\cos\varphi$$

$$v = \sin\theta\sin\varphi,$$

where $x_{mn}$ (x in vector form) is the complex excitation of element (m, n) in transmitting antenna subarray TX, d is the element spacing, k is the wavenumber, λ is the wavelength and (θ,ϕ) is the direction in space in spherical coordinates. The array normal direction is given by θ=0 degrees.

Let $F_0$ be the quiescent pattern transmitting antenna subarray TX obtained when no constraints regarding nulls in receiving antenna subarray RX have been applied $$F_0 = \sum_m \sum_n x_{0mn} e^{-jkd(mu+nv)}, \tag{2}$$

where $x_{0mn}$ ($x_0$ in vector form) is the corresponding excitation.

Let $F_a$ be the approximate pattern obtained when constraints regarding nulls have been applied $$F_a = \sum_m \sum_n x_{amn} e^{-jkd(mu+nv)}, \tag{3}$$

where $x_{amn}$ ($x_a$ in vector form) is the corresponding excitation. Let $F_a$ be the closest approximation, in the least mean square sense, to the quiescent pattern $F_0$.

The coupling, b, from the elements in transmitting antenna subarray TX to the elements in receiving antenna subarray RX is $$b = S_{BA} x, \tag{4}$$

where $S_{BA}$ is the scattering-matrix with the transmitting antenna subarray TX to receiving antenna subarray RX mutual coupling coefficients. $S_{BA}$ is a P×Q matrix, where P and Q is the number of elements in receiving antenna subarray RX and transmitting antenna subarray TX respectively.

The synthesis problem can then be stated as: find the approximate pattern $F_a$ such that the mean square difference $$\varepsilon(F_a) = \frac{d^2}{\lambda^2} \int_{-\frac{\lambda}{2d}}^{\frac{\lambda}{2d}} \int_{-\frac{\lambda}{2d}}^{\frac{\lambda}{2d}} |F_0(u, v) - F_a(u, v)|^2 \, dv \, du = \min, \tag{5}$$

subject to the constraint $$S_{BA} x_a = 0. \tag{6}$$

Parseval's identity on equation (5) gives $$\varepsilon(F_a) = \frac{d^2}{\lambda^2} \int_{-\frac{\lambda}{2d}}^{\frac{\lambda}{2d}} \int_{-\frac{\lambda}{2d}}^{\frac{\lambda}{2d}} |F_0(u, v) - F_a(u, v)|^2 \, dv \, du = \sum_m \sum_n |x_{0mn} - x_{amn}|^2 = (x_0 - x_a)^T (\overline{x}_0 - \overline{x}_a) = \|x_0 - x_a\|^2 = \varepsilon(x_a) \tag{7}$$

Where the horizontal bar symbol denote complex conjugate. Superscript T denotes transpose.

The synthesis problem now becomes $$\epsilon(x_a) = \|x_0 - x_a\|^2 = \min \tag{8}$$

$$g(x_a) = S_{BA} x_a = 0 \tag{9}$$

The solution to this optimization problem can be obtained by using "Lagrange's multipliers"

$$\frac{\partial}{\partial x_{ai}} \left( \varepsilon(x_a) + \sum_{j=1}^{P} \beta_j g_j(x_a) \right) = 0, \; i = 1 \ldots Q, \tag{10}$$

The solution to this optimization problem is unequivocal and can be obtained by using the above described "Lagrange's multipliers" or any other suitable technique.

where β is a complex vector to be determined. Element index m, n has for simplicity been replaced by the single index i, j is the receiving antenna subarray RX element index. Substitution of equation (8) and equation (9) in equation (10) gives $$\frac{\partial}{\partial x_{ai}}\left((x_0 - x_a)^T(\overline{x}_0 - \overline{x}_a) + \sum_{j=1}^{P}\beta_j S_{BA,row\,j} x_a\right) = \quad (11)$$

$$\frac{\partial}{\partial x_{ai}}\left(x_0^T\overline{x}_0 - x_0^T\overline{x}_a - x_a^T\overline{x}_0 + x_a^T\overline{x}_a + \sum_{j=1}^{P}\beta_j S_{BA,row\,j} x_a\right) =$$

$$-\overline{x}_{0i} + \overline{x}_{ai} + \sum_{j=1}^{P}\beta_j S_{BA,ji} = -\overline{x}_{0i} + \overline{x}_{ai} + \beta^T S_{BA,column\ i} =$$

$$0 \Leftrightarrow -\overline{x}_0 + \overline{x}_a + (\beta^T S_{BA})^T = 0 \Leftrightarrow x_a = x_0 - S_{BA}^*\overline{\beta},$$

where superscript * denote conjugate transpose. $\overline{\beta}$ is determined from equation (9) and (11)

$$0 = S_{BA}x_a = S_{BA}(x_0 - S^*_{BA}\overline{\beta}) = S_{BA}x_0 - S_{BA}S^*_{BA}\overline{\beta} \Rightarrow$$

$$\overline{\beta} = (S_{BA}S^*_{BA})^{-1}S_{BA}x_0 \quad (12)$$

Substitution of equation (12) in equation (11) finally gives $$x_a = x_0 - S^*_{BA}(S_{BA}S^*_{BA})^{-1}S_{BA}x_0 = (I - S^*_{BA}(S_{BA}S^*_{BA})^{-1}S_{BA})x_0, \quad (13)$$

where l is the identity matrix. Equation (13) shows how to modify the quiescent excitation $x_0$ in the transmitting antenna subarray TX in order to get nulls at the elements in subarray B.

Box 13 shows that equation (13) is used to control the elements in the transmitting antenna subarray antenna TX to transmit a signal that nullifies the coupling energy in the receiving antenna subarray antenna RX.

Below follows a numerical example where the transmitting antenna subarray comprises 32×32 elements and where the receiving antenna subarray comprises 16×16 element having subarray coupling, according to the description in connection to any one of FIGS. 1-4.

Equation (13) has been applied in order to reduce the coupling between a transmitting antenna subarray TX with 32×32 elements and a receiving antenna subarray antenna RX with 16×16 elements. The subarrays are positioned in opposite corners of an array with 80×80 antenna elements (not shown). The antenna elements, in both the transmitting antenna subarray TX and the receiving antenna subarray antenna RX, are arranged in a quadratic lattice with element spacing d in both spatial directions. The mutual coupling coefficients have been determined from measurements. The transmitting antenna subarray antenna TX have a uniform taper and is steered to three different directions $(\theta_0,\phi_0)=(0°, 0°)$, (60°,45°) (i.e. toward the receiving antenna subarray RX) and (60°,225°) (i.e. away from the Receiving antenna subarray RX), by way of conventional methods.

Figure 5A:
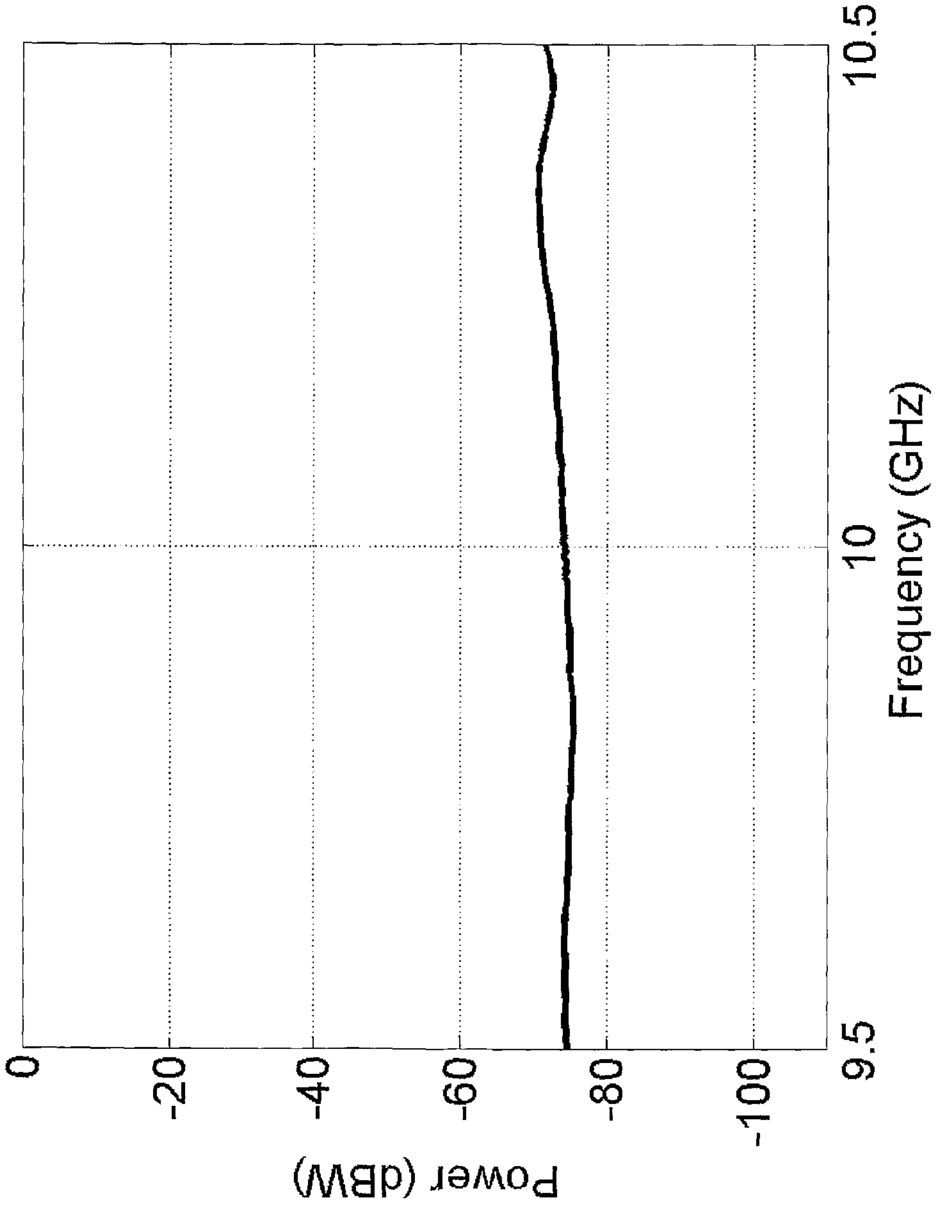
FIGS. 5*a* and 5*b* show the power coupling from the transmitting antenna subarray TX and receiving antenna subarrays RX over a 1 GHz frequency band at 10 GHz for the transmitting antenna subarray TX scan direction) $(\theta_0,\phi_0)=(0°,0°)$, without the use of the inventive method and with the use of the inventive method respectively.
Figure 5B:
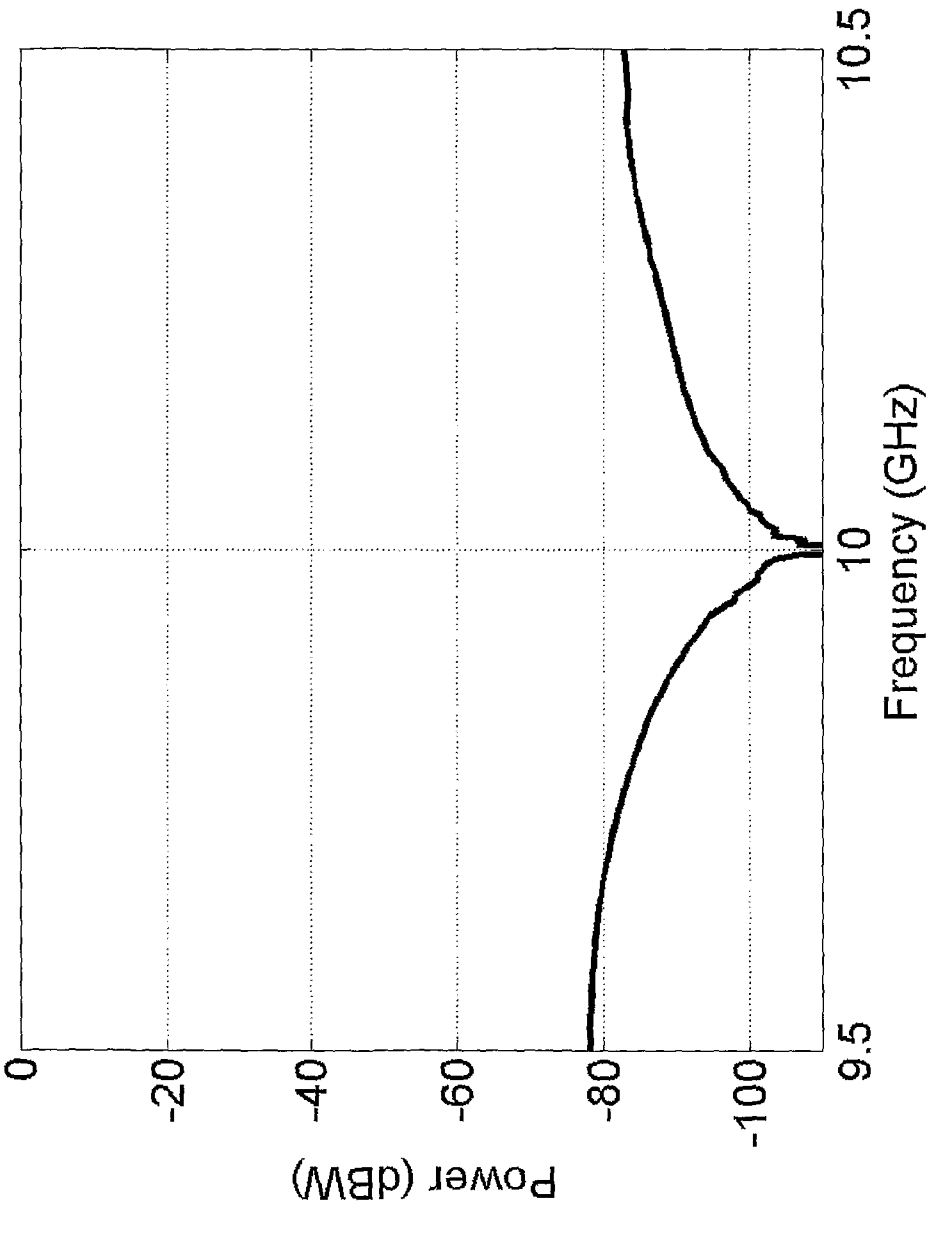

FIGS. 5*a* and 5*b* show the power coupling from the transmitting antenna subarray TX to the Receiving antenna subarray RX over a 1 GHz frequency band at 10 GHz for the transmitting antenna subarray TX scan direction) $(\theta_0,\phi_0)=(0°,0°)$. FIG. 5*a* shows no zeros at the Receiving antenna subarray RX and FIG. 5*b* shows zeros at the Receiving antenna subarray RX. Equation (13) has been used for the result in FIG. 5*b*, but not in FIG. 5*a*. The excitation according to equation (13) has been determined at the center frequency 10 GHz and has thereafter been used for the whole frequency band.

Figure 6A:
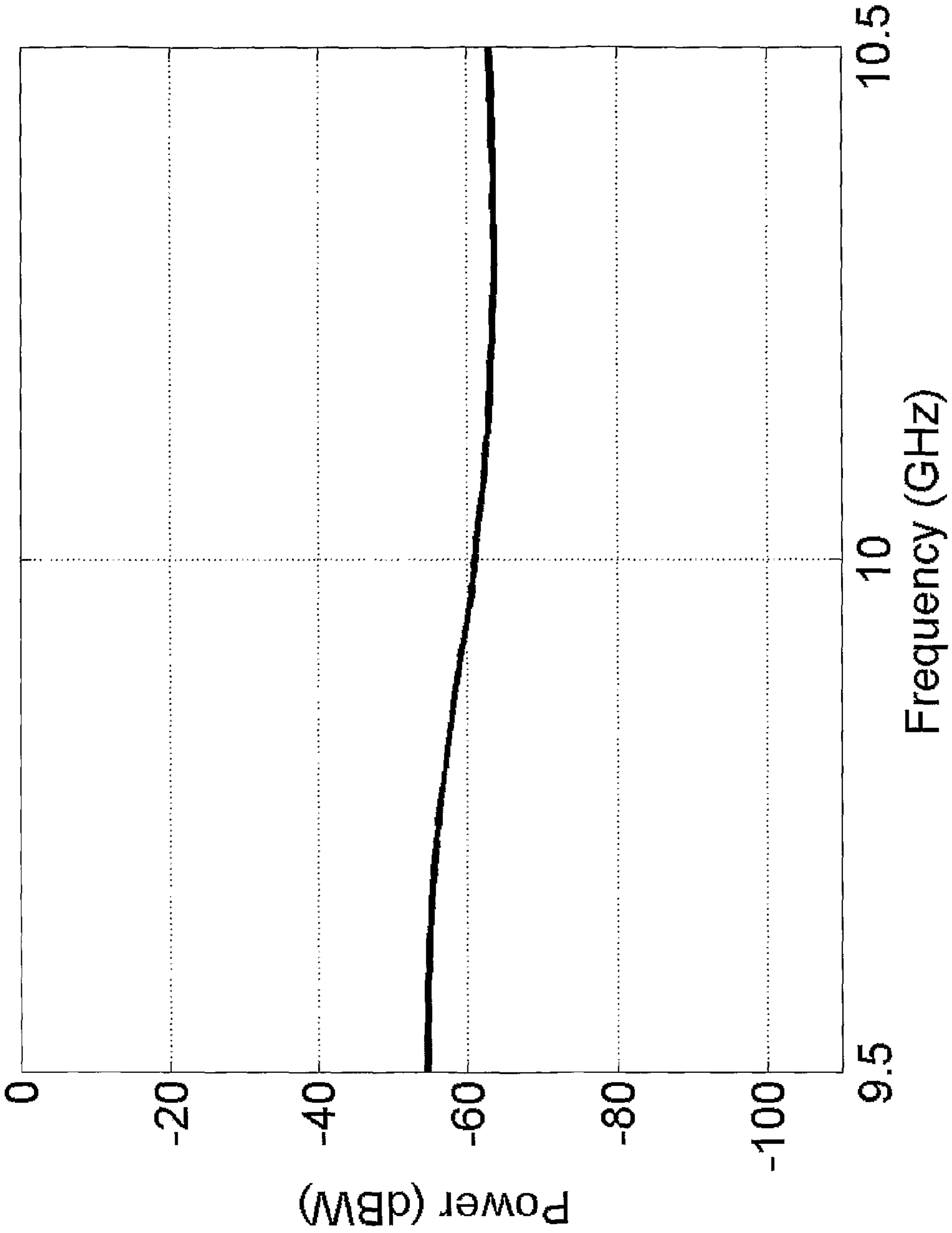
FIGS. 6*a* and 6*b* show the power coupling from the transmitting antenna subarray TX and receiving antenna subarrays RX over a 1 GHz frequency band at 10 GHz for the transmitting antenna subarray TX scan direction $(\theta_0,\phi_0)=(60°,45°)$, without the use of the inventive method and with the use of the inventive method respectively.
Figure 6B:
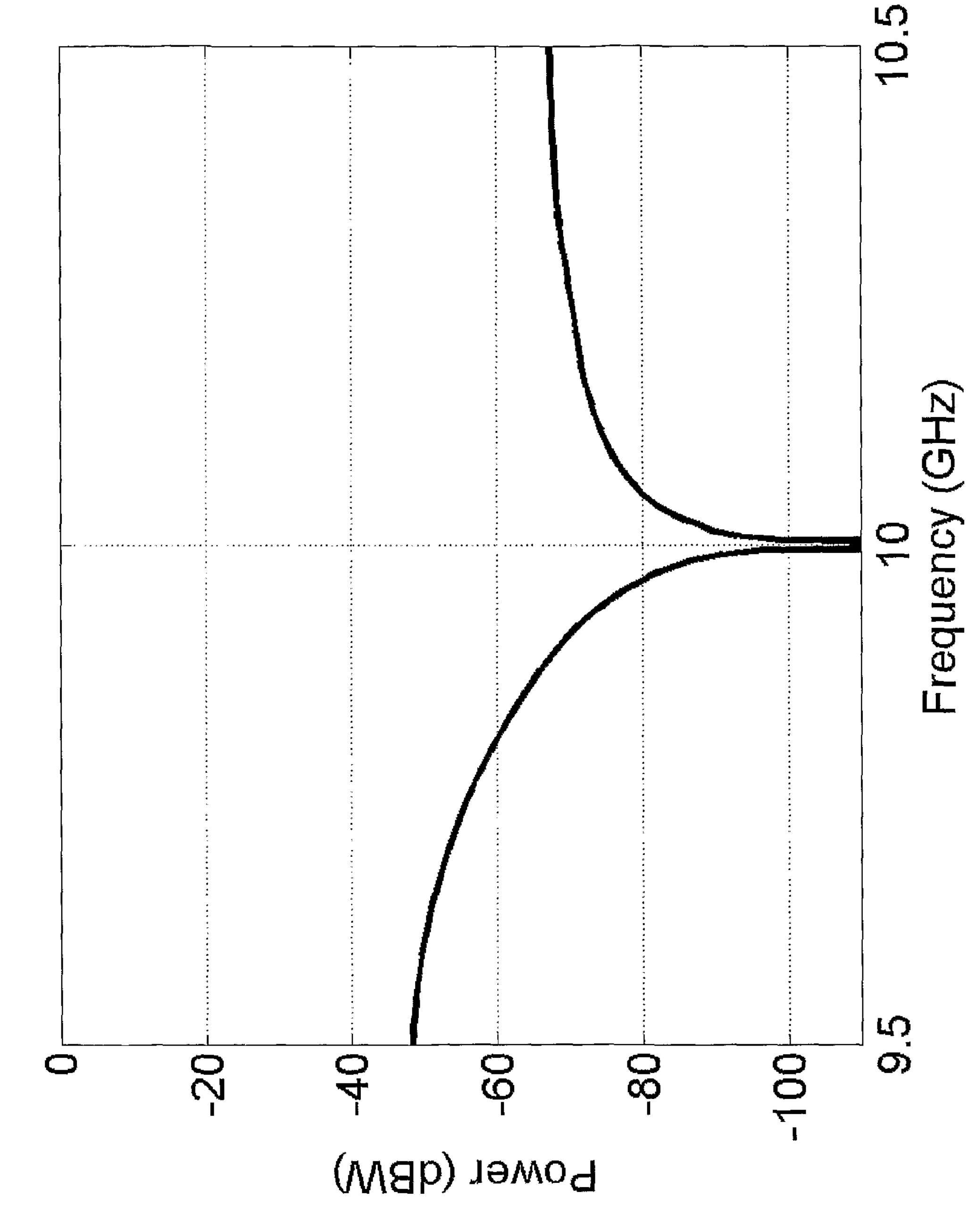

FIGS. 6*a* and 6*b* show the power coupling from the transmitting antenna subarray antenna TX to the receiving antenna subarray RX over a 1 GHz frequency band at 10 GHz for the transmitting antenna subarray TX scan direction $\theta_0,\phi_0=60°$, 45°, i.e. toward the receiving antenna subarray RX. FIG. 6*a* shows no zeros at the receiving antenna subarray RX and FIG. 6*b* shows zeros at the receiving antenna subarray RX. Equation (13) has been used for the result in FIG. 6*b*, but not in FIG. 6*a*. The excitation according to equation (13) has been determined at the center frequency 10 GHz and has thereafter been used for the whole frequency band.

Figure 7A:
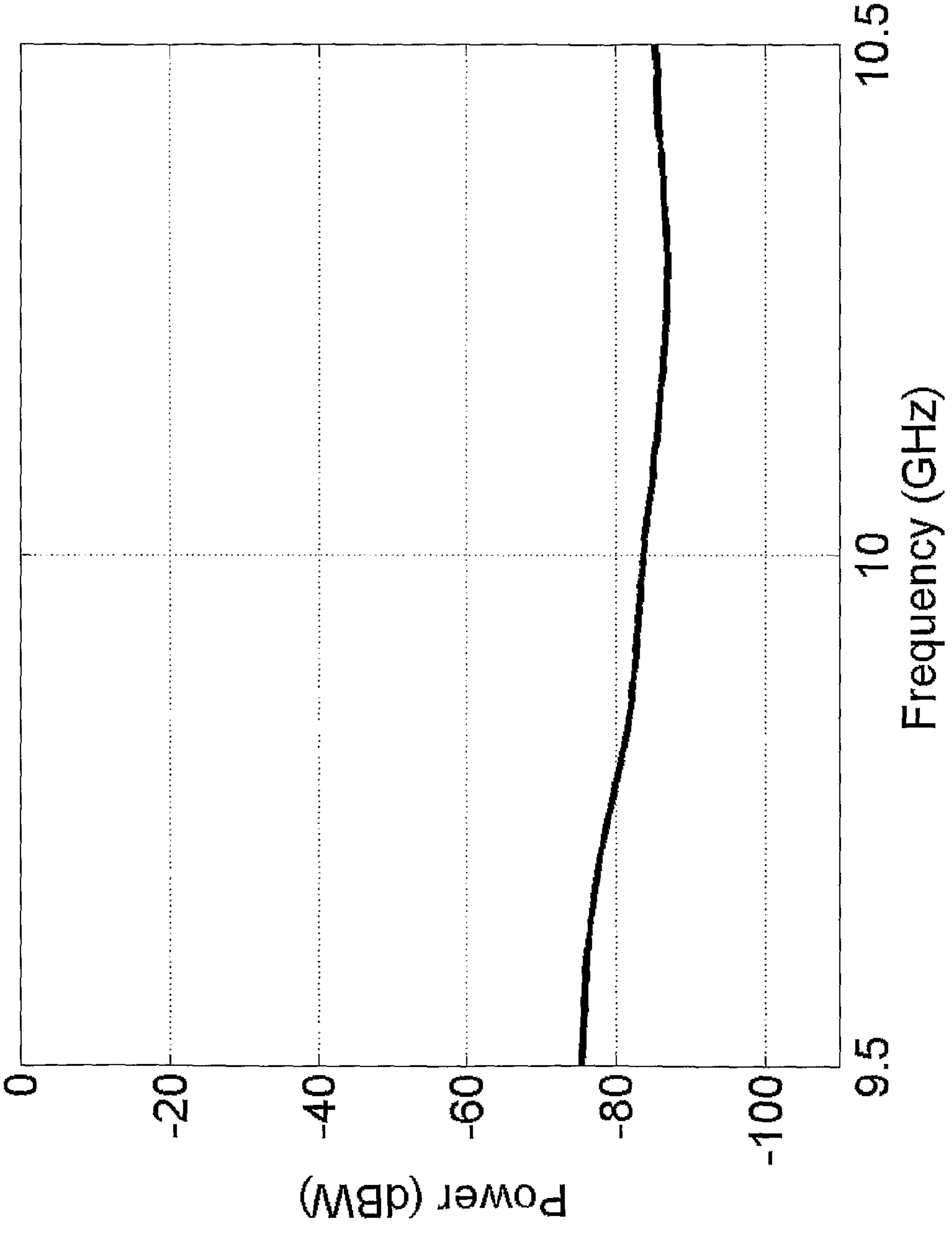
FIGS. 7*a* and 7*b* schematically show the power coupling from the transmitting antenna subarray TX to the receiving antenna subarray RX over a 1 GHz frequency band at 10 GHz for the transmitting antenna subarray TX scan direction $(\theta_0,\phi_0)=(60°,225°)$, without the use of the inventive method and with the use of the inventive method respectively.
Figure 7B:
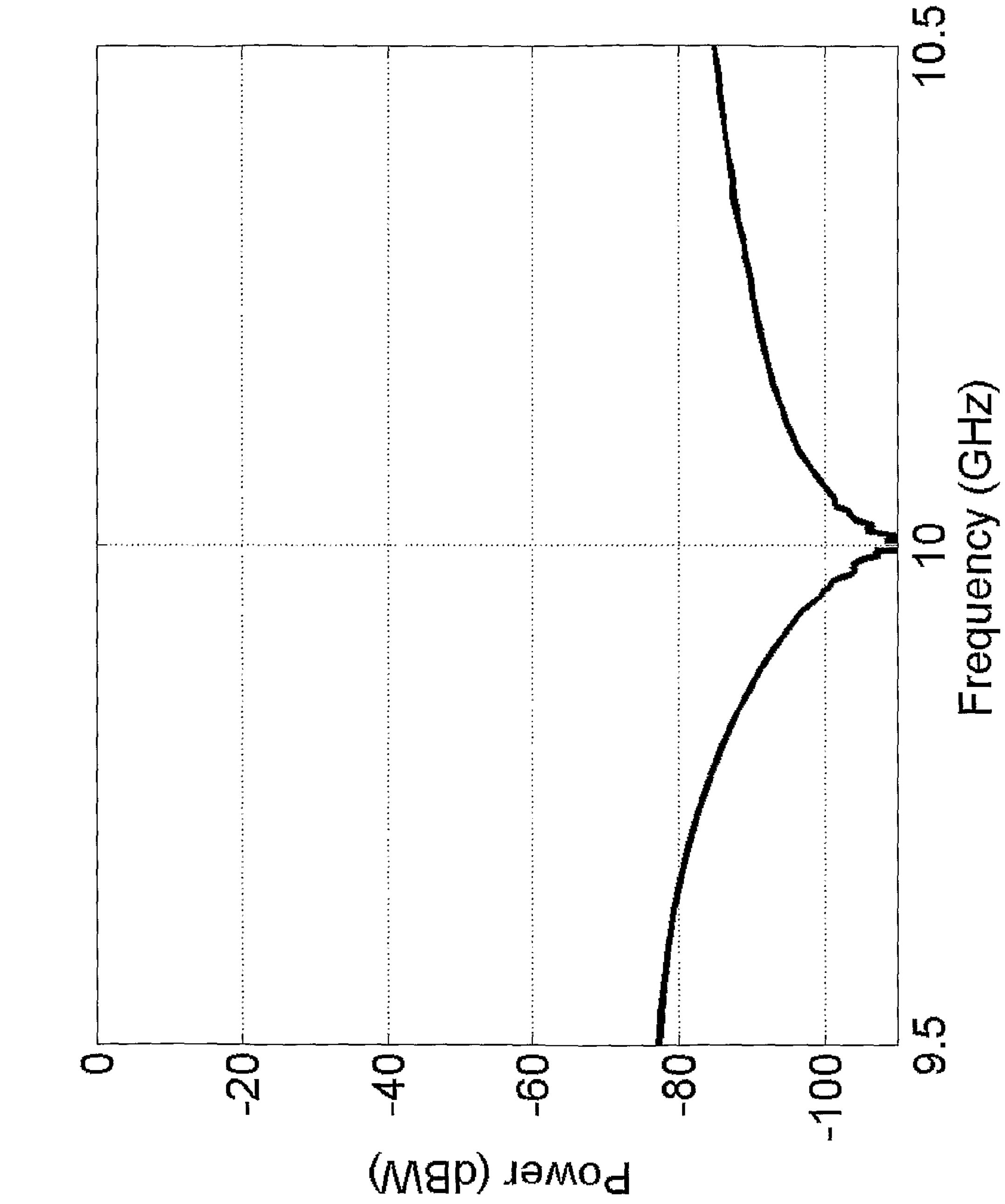

FIGS. 7*a* and 7*b* show the power coupling from the transmitting antenna TX to the Receiving antenna subarray RX over a 1 GHz frequency band at 10 GHz for the transmitting antenna subarray TX scan direction $\theta_0,\phi_0=60°,225°$, i.e. away from the receiving antenna subarray RX. FIG. 7*a* shows no zeros at the receiving antenna subarray RX and FIG. 7*b* shows zeros at the receiving antenna subarray RX. Equation (13) has been used for the result in FIG. 7*b*, but not in FIG. 7*a*. The excitation according to equation (13) has been determined at the center frequency 10 GHz and has thereafter been used for the whole frequency band.

Parameter Study:

The dependency on some parameters in the new method for subarray to subarray coupling reduction is investigated in this section. The same 80×80 element array as in the previous section is used.

Subarray Spacing:

The coupling from a 32×32 element transmitting antenna subarray TX to a 16×16 element receiving antenna subarray RX for four different spacing between the subarrays is investigated in this section.

Figure 8:
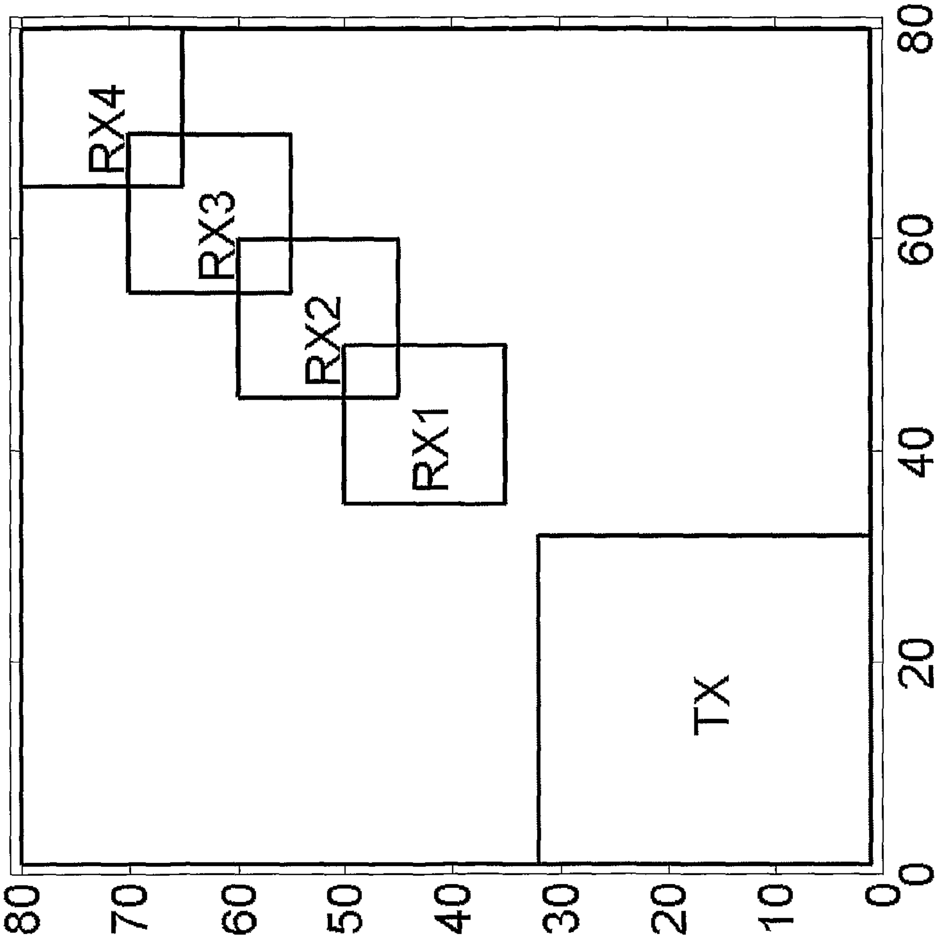
FIG. 8 schematically shows a transmitting antenna subarray TX with fixed position and four different receiving antenna subarray Rx positions.

FIG. 8 schematically shows a transmitting antenna subarray TX with fixed position and four different receiving antenna subarray Rx positions relative the transmitting antenna subarray TX. The transmitting antenna subarray TX is positioned in one of the corner of the array and the receiving antenna subarray RX is positioned on the array diagonal (passing through the transmitting antenna subarray TX) at four different subarray sub-to-sub centre to centre distances D, being 37*d*, RX1; 51*d*, RX2; 65*d*, RX3; and 79*d*, RX4, where d is the element spacing. The transmitting antenna subarray TX has a uniform taper and is steered to $(\theta_0,\phi_0)=(0°,0°)$.

The position of the elements or the geometrical features or the material in the transmitting antenna subarray or the receiving antenna subarray are not important per se for the invention but are implicitly taken into consideration during the coupling measurements or must be known when the coupling should be calculated.

Figure 9A:
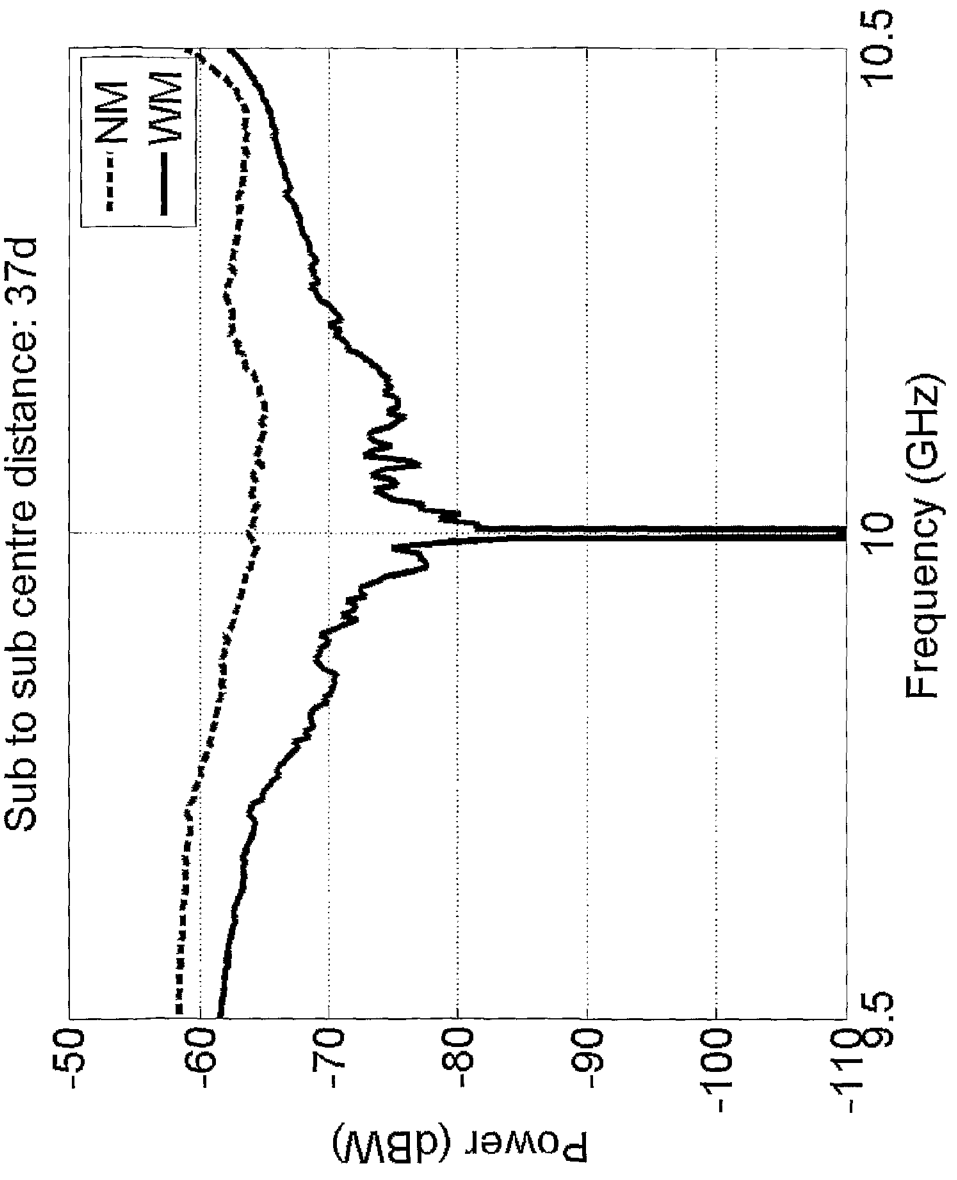
FIGS. 9*a*-9*d* schematically show the transmitting antenna subarray TX power coupled to the Receiving antenna subarray RX for a 9.5-10.5 GHz frequency band with and without the method according to the invention and for the four different antenna subarray Rx positions in FIG. 8.
Figure 9B:
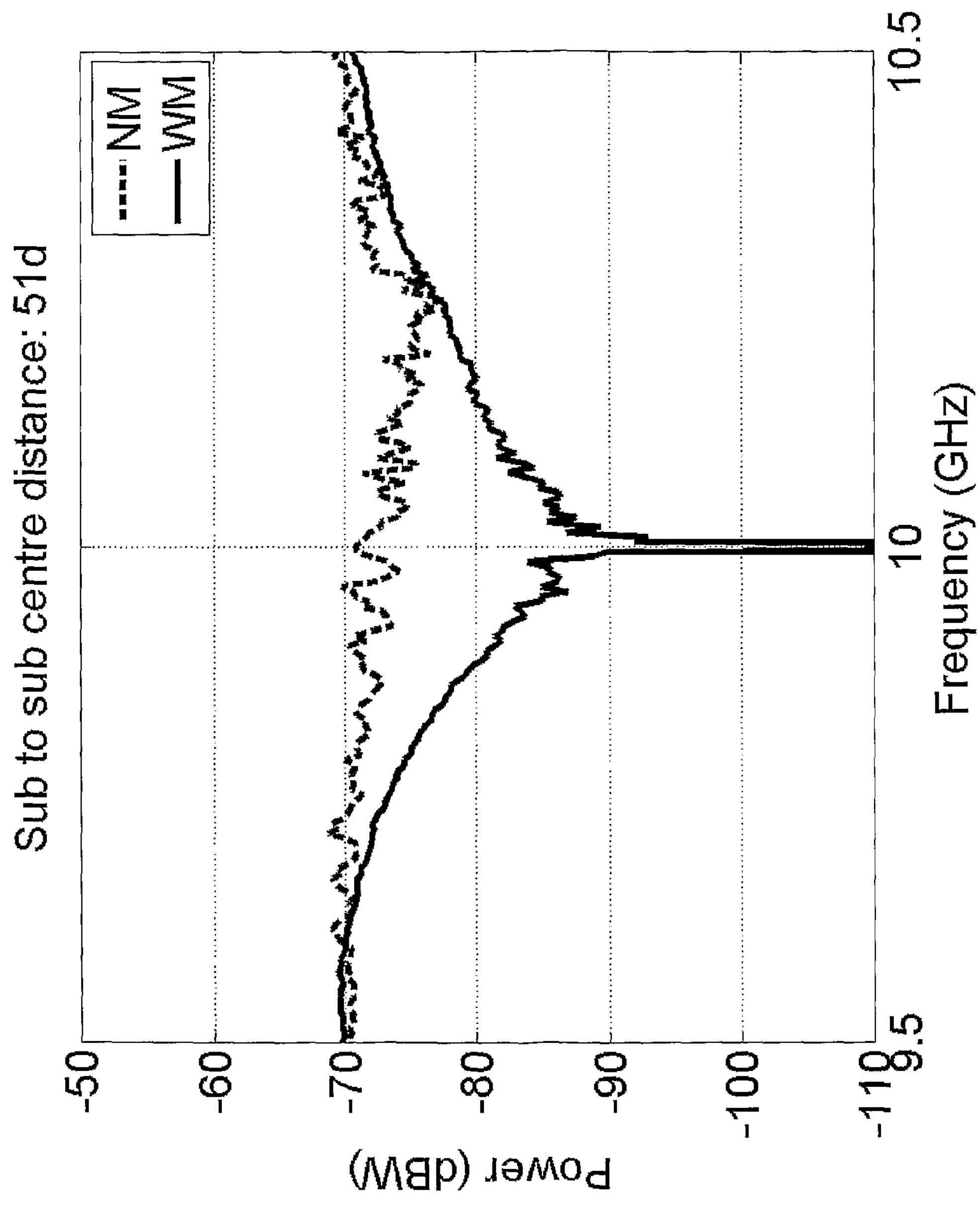
Figure 9C:
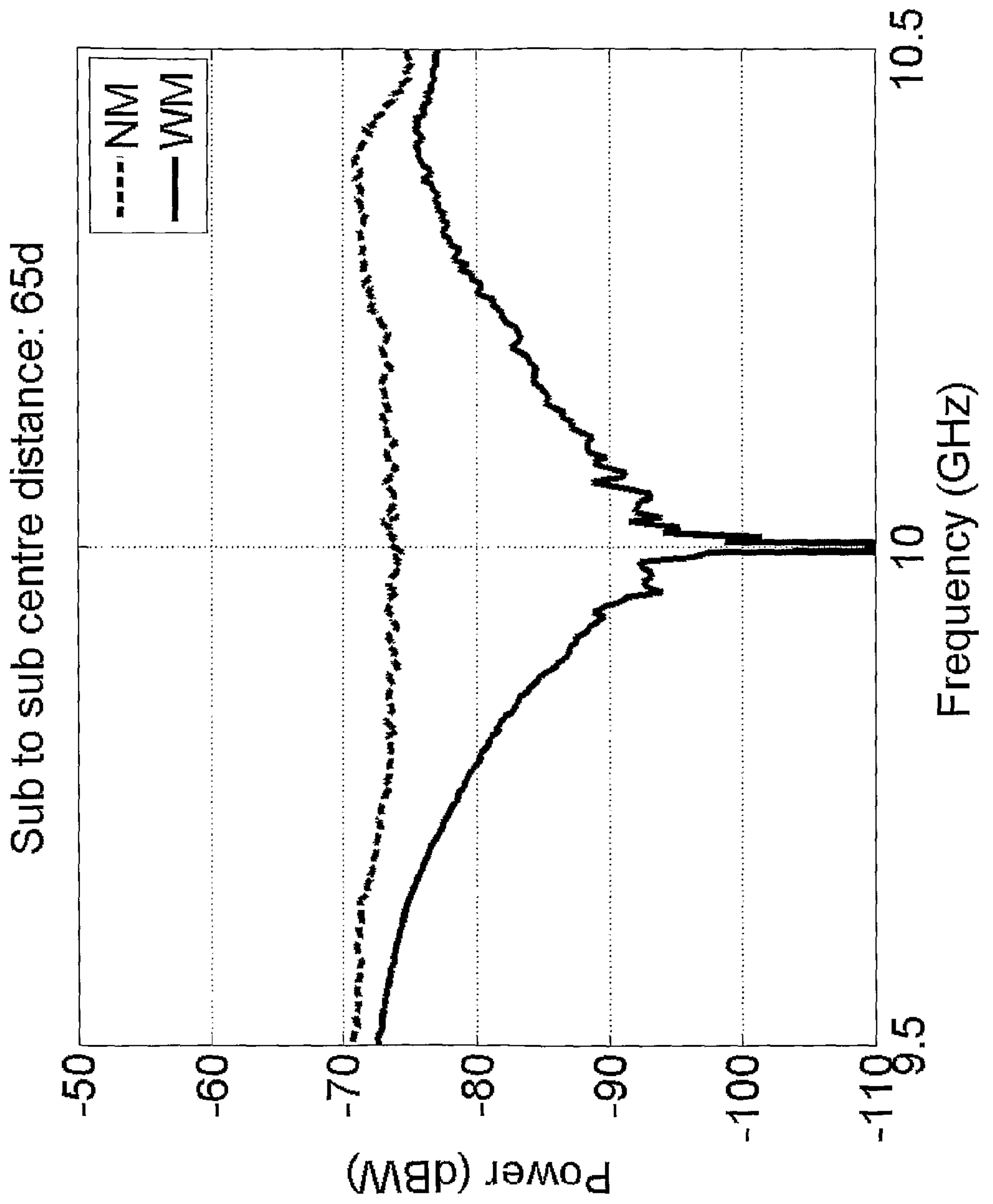
Figure 9D:
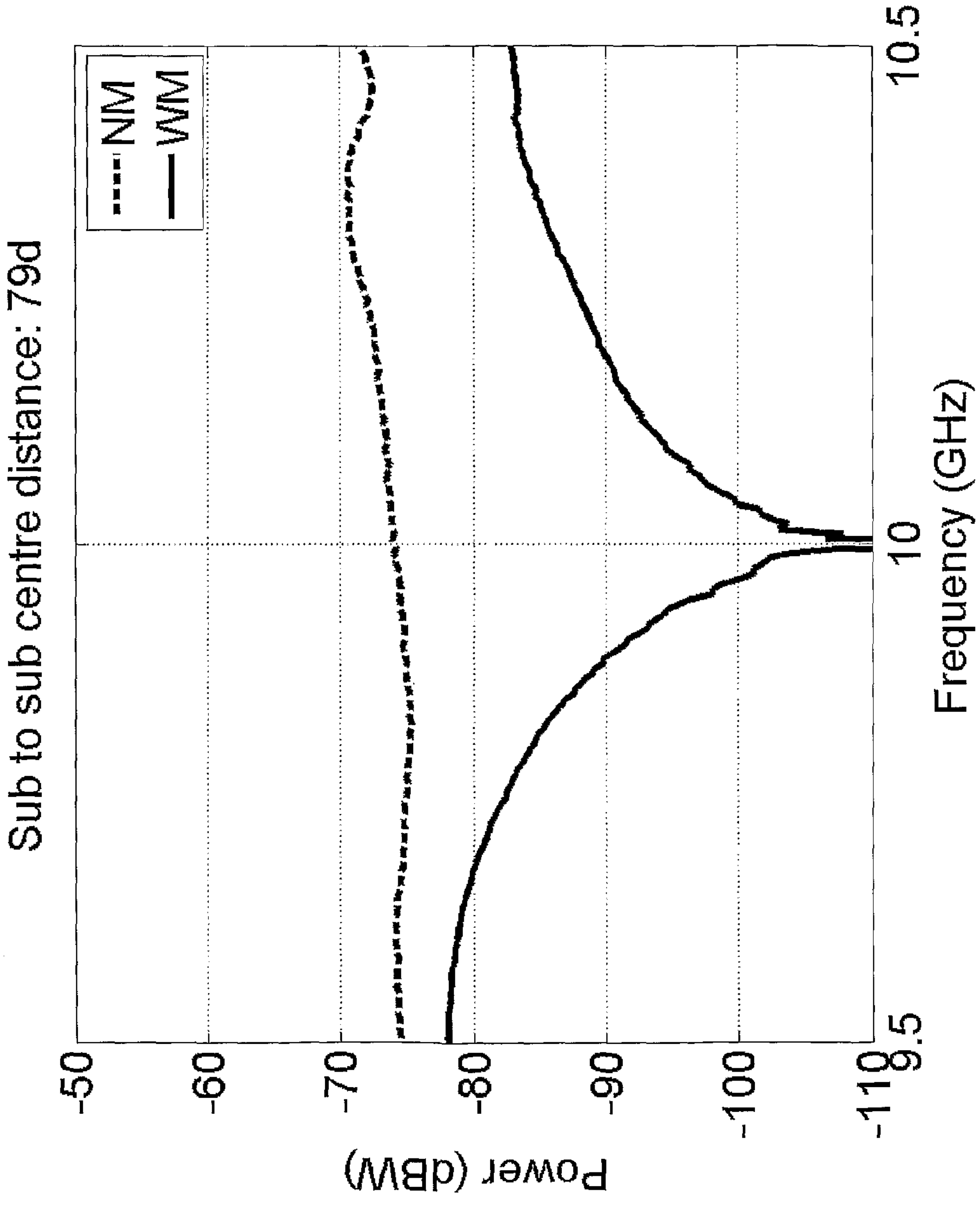

FIGS. 9*a*-9*d* schematically shows the transmitting antenna subarray TX power coupled to the receiving antenna subarray RX for a 9.5-10.5 GHz frequency band with and without the method according to the invention and for the four different centre distances D in FIG. 8. FIG. 9*a* shows the result for the sub-to-sub centre distance 37*d*. FIG. 9*b* shows the result for the sub-to-sub centre distance 51*d*. FIG. 9*c* shows the result for the sub-to-sub centre distance 65*d*. FIG. 9*b* shows the result for the sub-to-sub centre distance 79*d*.

FIGS. 9*a*-9*d* show the transmitting antenna subarray TX power coupled to the Receiving antenna subarray RX with use of the method according to the invention, i.e. equation (13), shown with the lower continuous line WM in FIGS. 9*a*-9*d* and without the use of the method according to the invention shown with the upper continuous line NM in FIGS. 9*a*-9*d*. The excitation according to equation (13) has been determined at the center frequency 10 GHz and has thereafter been used for the whole frequency band.

Figure 10:
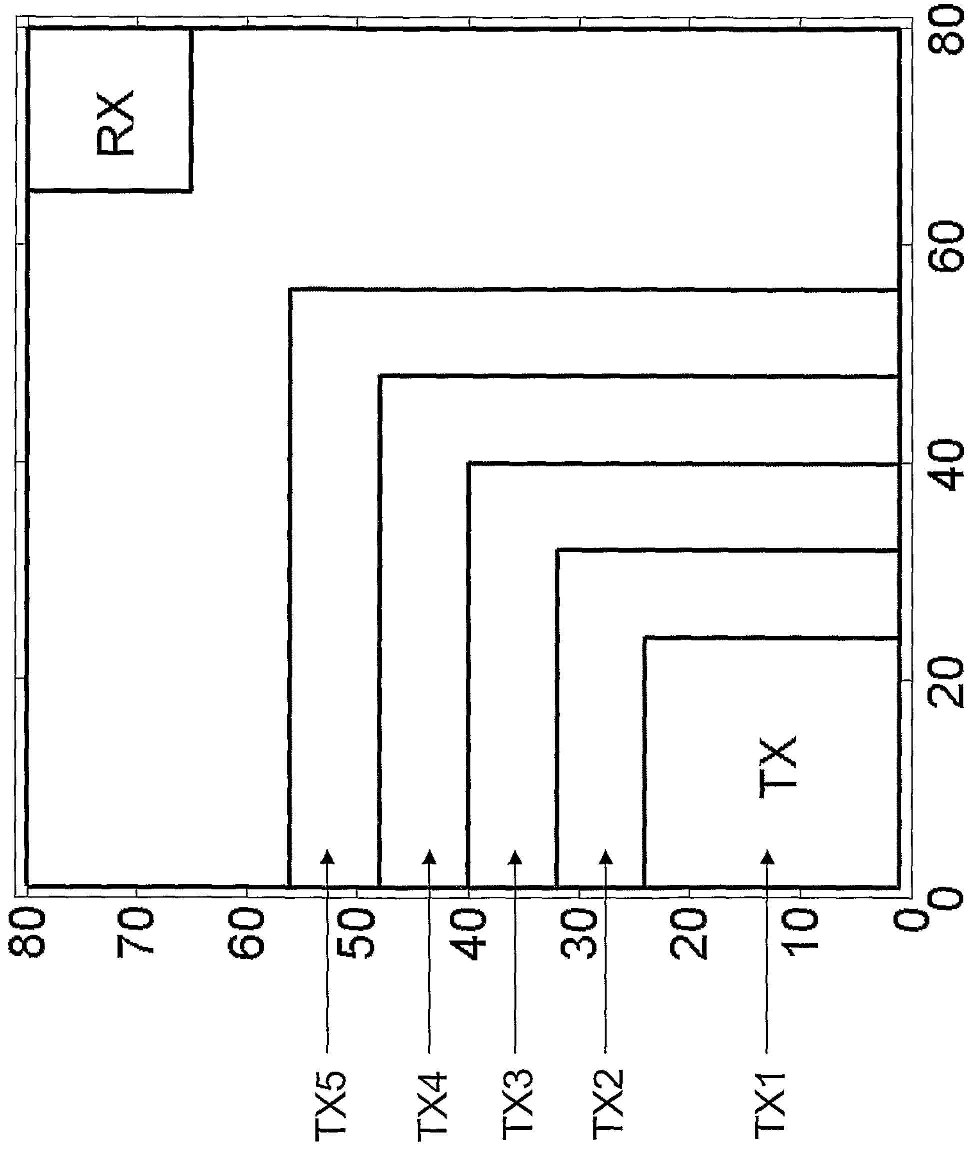
Figure 11A:
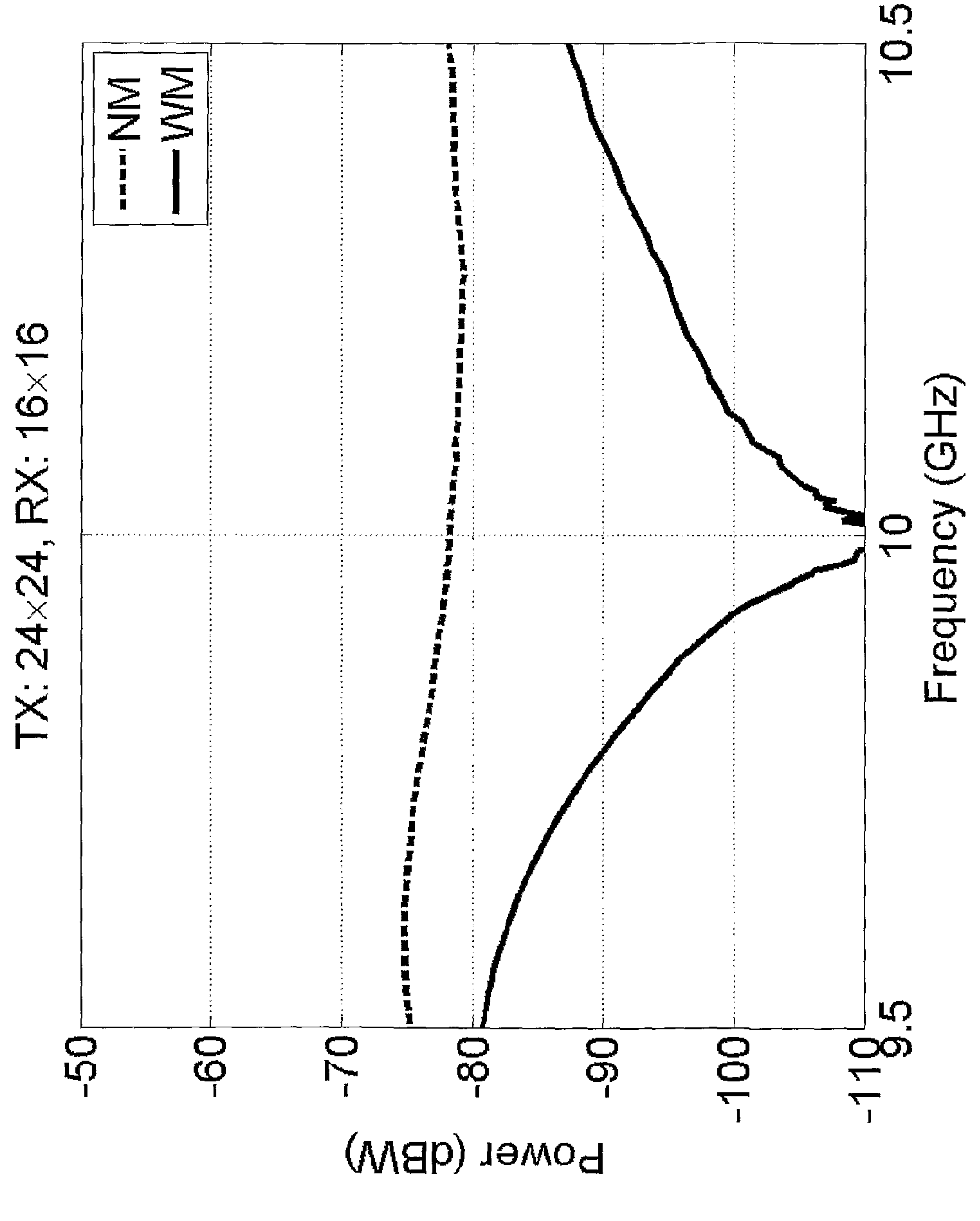
FIGS. 11*a*-11*e* schematically show the coupling of the transmitting antenna subarrays Tx to the receiving antenna subarray RX for the different cases in FIG. 10, with the use of the method according to the invention and without the use of the method.
Figure 11B:
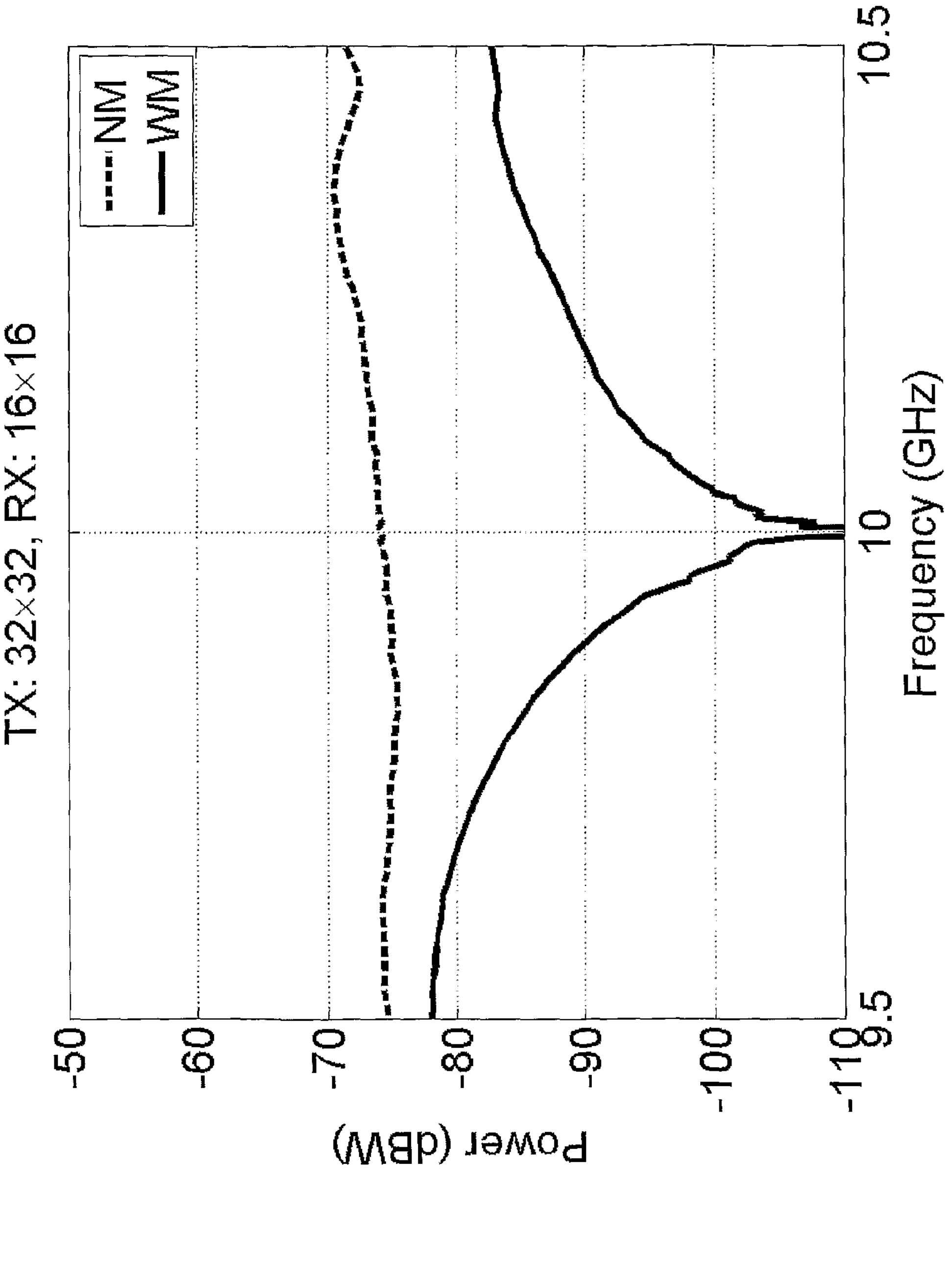
Figure 11C:
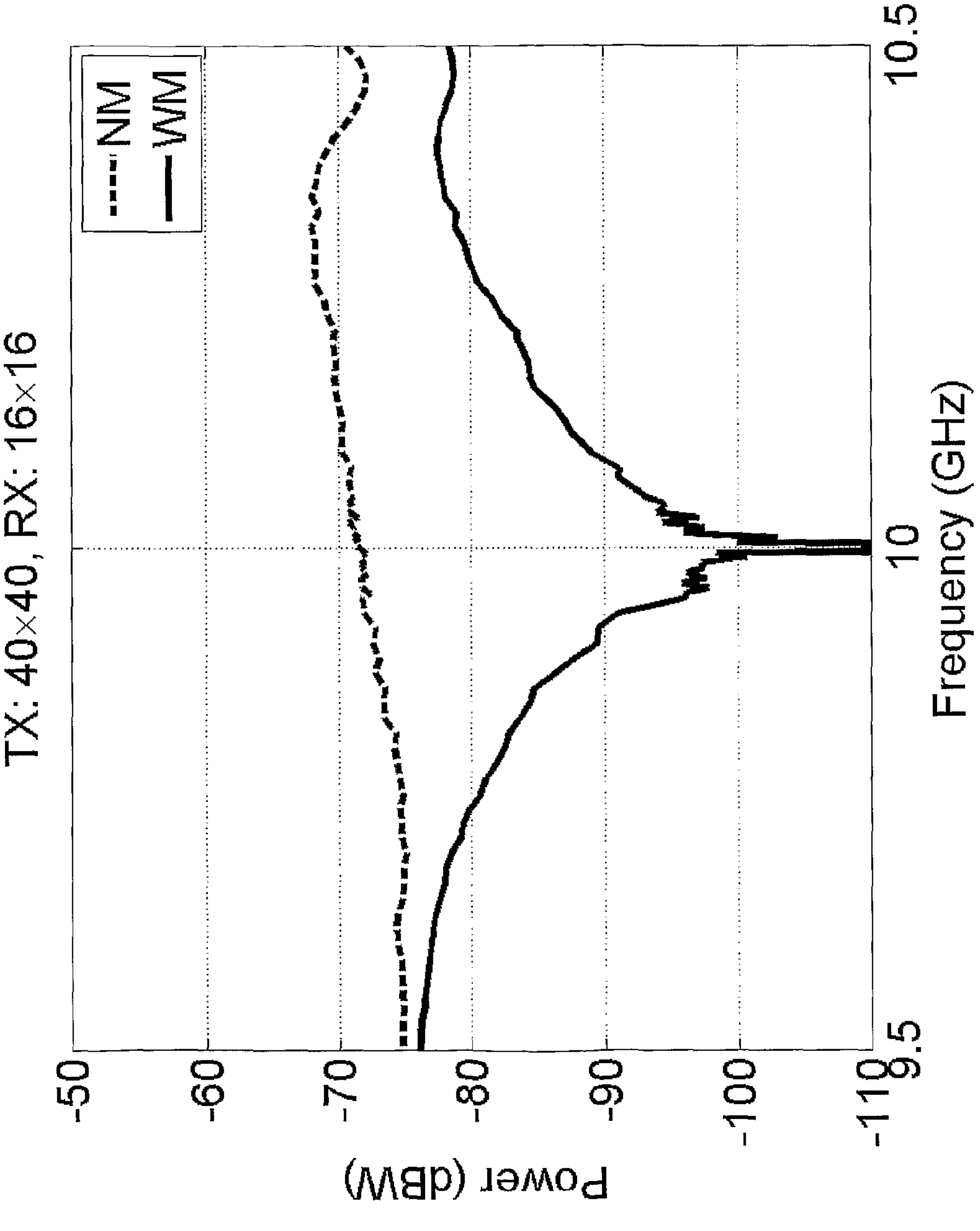
Figure 11D:
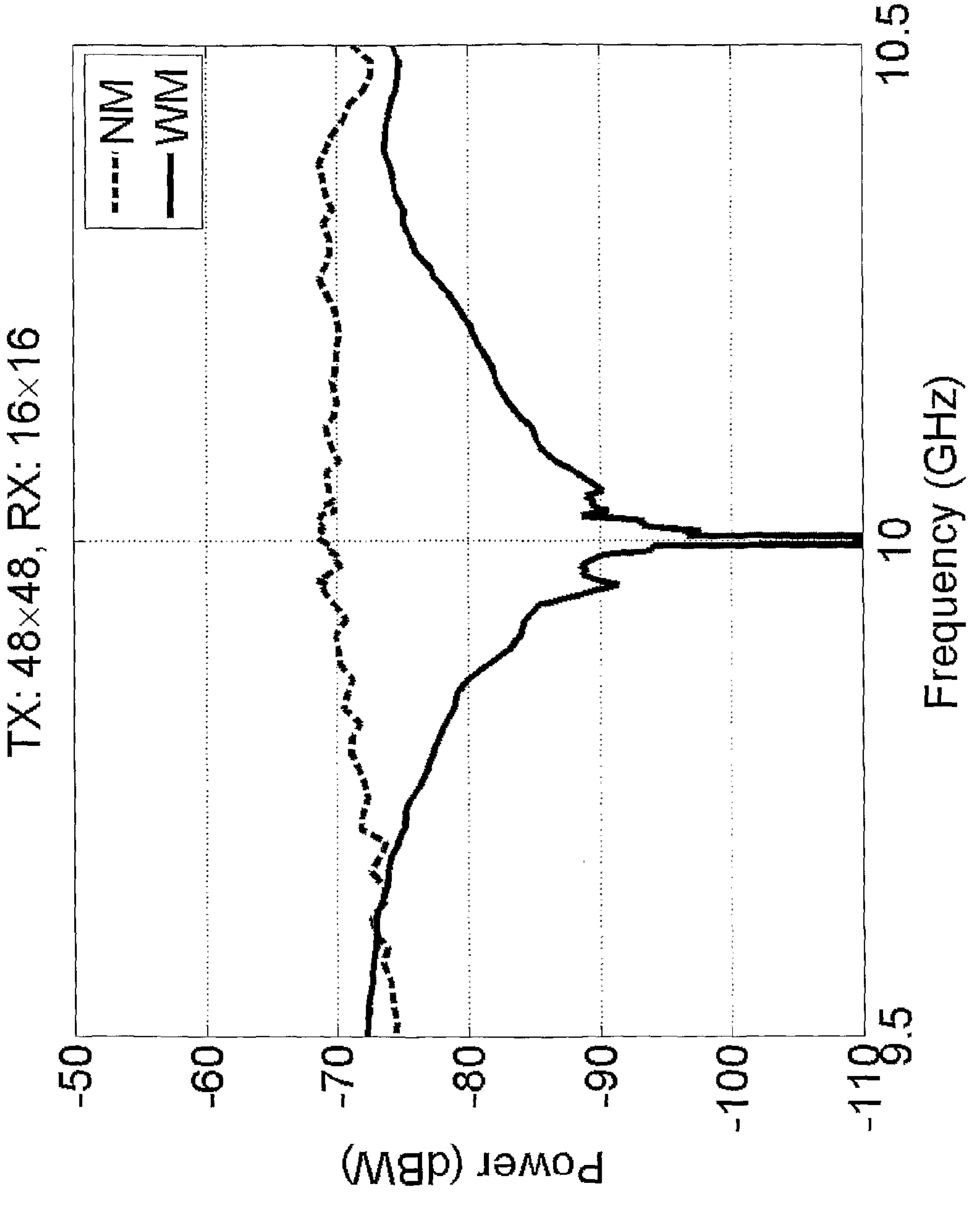
Figure 11E:
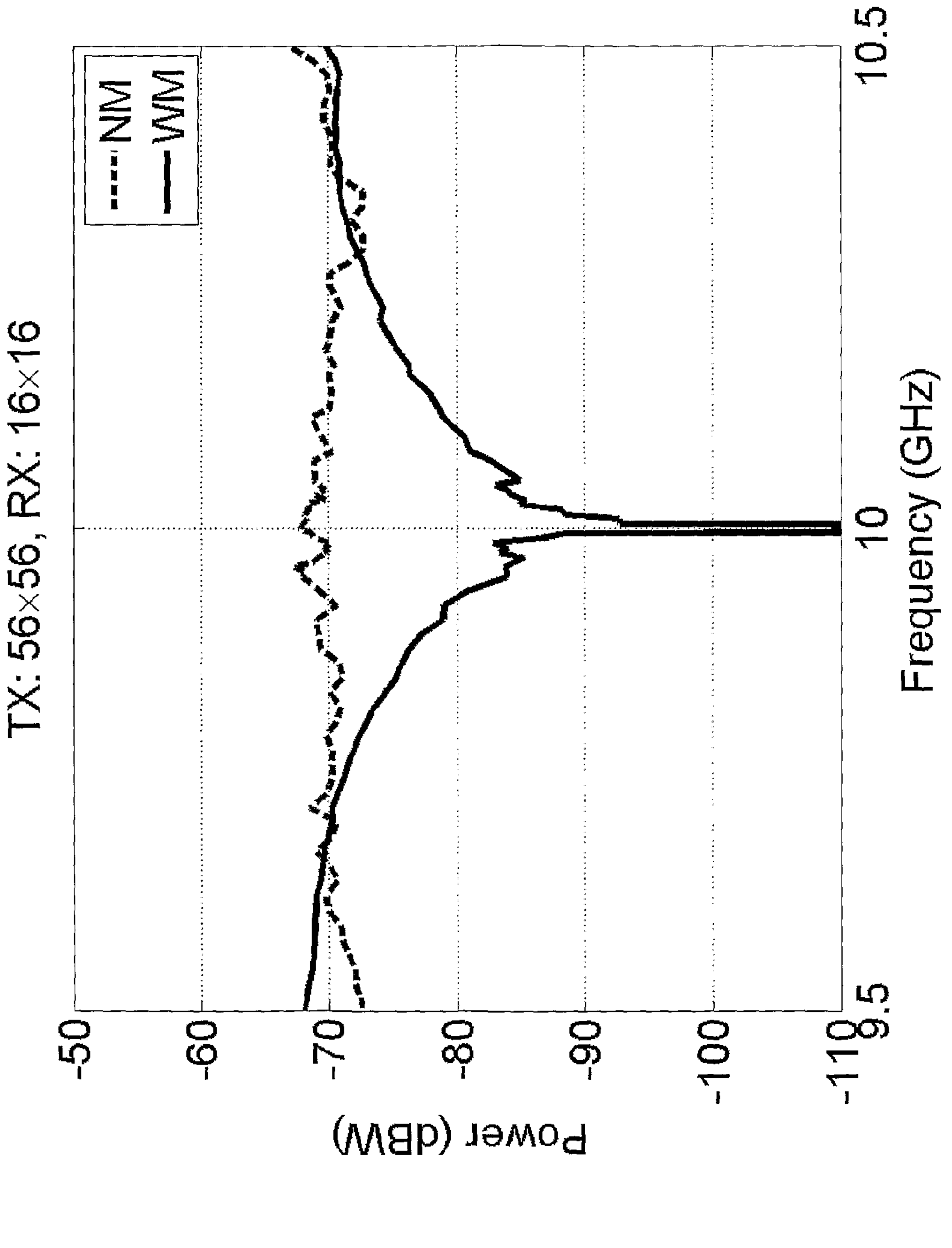

Sub-Array Size:

FIG. 10 schematically shows five different sized transmitting antenna subarrays TX and a fixed sized and position of the receiving antenna subarray RX. The coupling from transmitting antenna subarrays TX with 24×24, TX1, 32×32, TX2, 40×40, TX3, 48×48, TX4, and 56×56, TX5, elements to a 16×16 element receiving antenna subarray RX is investigated in this section. FIG. 10 shows that the transmitting antenna subarrays TX are positioned in one of the corner of the array and the receiving antenna subarray RX is positioned at the opposite corner. Observe that the centre distance D between the transmitting antenna subarray TX and the receiving antenna subarray RX decreases with increased transmitting antenna subarray TX size. The transmitting antenna subarrays TX have uniform taper and are steered to $(\theta_0,\phi_0)=(0°,0°)$.

FIGS. 11*a*-11*e* schematically show the coupling of the transmitting antenna subarrays Tx to the receiving antenna subarray RX for the different cases in FIG. 10, with the use of the method according to the invention and without the use of the method.

FIGS. 11*a*-11*e* show the result of the subarray to subarray coupling for the five different transmitting antenna subarray TX sizes with the transmitting antenna subarray TX steered to $(\theta_0,\phi_0)=(0°,0°)$.).

FIGS. 11*a*-11*e* show the transmitting antenna subarray TX power coupled to the receiving antenna subarray RX with use of the method according to the invention, i.e. equation (13), shown with the lower continuous line WM in FIGS. 11*a*-11*ed* and without the use of the method according to the invention shown with the upper continuous line NM in FIGS. 11*a*-11*e*. The excitation according to equation (13) has been determined at the center frequency 10 GHz and has thereafter been used for the whole frequency band.

From FIGS. 1-11 it becomes clear that the method according to the invention gives the desired nulling at the Receiving antenna subarray RX with different steering of the transmitting antenna subarray TX and with different sizes and positions of the transmitting antenna subarray TX and receiving antenna subarrays RX. Hence, the above examples should be used to verify that the inventive method can be used for any antenna system configuration that allows measurement or calculation of the coupling between each antenna element in the transmitting antenna subarray TX and each element in the Receiving antenna subarray RX such that a scattering-matrix can be used in equation (13).

The invention claimed is:

1. A method for an antenna system comprising a transmitting phase array antenna comprising a transmitting antenna subarray comprising a number Q antenna elements transmitting on a first frequency and a receiving phase array antenna comprising a receiving antenna subarray comprising a number P antenna elements, the transmitting antenna subarray antenna being positioned at a distance relative the receiving antenna subarray antenna, wherein the transmitting antenna subarray antenna transmits a first signal at a first time period and wherein the receiving antenna subarray antenna receives the first signal at least partly within the first time period causing a coupling between the transmitting antenna subarray antenna and the receiving antenna subarray antenna, the method comprising:

deciding the coupling between the antenna elements in the transmitting antenna subarray antenna and the antenna elements in the receiving antenna subarray antenna are in a scattering-matrix $S_{BA}$, and utilizing the scattering matrix $S_{BA}$ as a constraint in order to modify a quiescent excitation $x_0$ in the transmitting antenna subarray in order to get nulls at the elements in the receiving antenna subarray by controlling the elements in the transmitting antenna subarray antenna to transmit a signal that nullifies the coupling energy in the receiving antenna subarray antenna.

2. The method according to claim 1, wherein Q is greater than P.

3. The method according to claim 1, wherein the coupling is decided by transmitting on one antenna element at a time in the transmitting antenna subarray antenna and receiving the signal on one antenna element at a time for every transmission of the antenna element in the transmitting antenna subarray antenna, and wherein the transmitted signal is measured in the receiving antenna subarray antenna giving the scattering matrix comprising Q times P measurements representing the coupling.

4. The method according to claim 1, wherein the coupling is decided by a numerical calculation by use of data regarding the distance from each element in the transmitting antenna subarray to each element in the receiving antenna subarray antenna and data regarding material and shape of the transmitting antenna subarray and the receiving antenna subarray antenna.

5. The method according to claim 1, further comprising:

calculating a modification of the quiescent excitation $x_0$ in transmitting antenna subarray, wherein calculating the modification comprises describing a transmitting antenna subarray far-field pattern by the array factor $$F = \sum_m \sum_n x_{mn} e^{-jkd(mu+nv)} \quad (1)$$
$$k = 2\pi/\lambda$$
$$u = \sin\theta\cos\varphi$$
$$v = \sin\theta\sin\varphi,$$

where $x_{mn}$ (x in vector form) is the complex excitation of element m, n in the transmitting antenna subarray antenna, d is the element spacing, k is the wavenumber, λ is the wavelength and (θ, ϕ) is the direction in space in spherical. The coordinated, wherein transmitting antenna subarray antenna normal direction is given by θ=0 degrees, wherein $F_0$ is the quiescent pattern of the transmitting antenna subarray obtained when no constraints regarding nulls in the receiving antenna subarray have been applied $$F_0 = \sum_m \sum_n x_{0mn} e^{-jkd(mu+nv)}, \quad (2)$$

where $x_{0mn}$ ($x_0$ in vector form) is the corresponding excitation, wherein $F_a$ is the approximate pattern obtained when constraints regarding nulls have been applied $$F_a = \sum_m \sum_n x_{amn} e^{-jkd(mu+nv)}, \quad (3)$$

where $x_{amn}$ ($x_a$ in vector form) is the corresponding excitation, let $F_a$ be the closest approximation, in the least mean square sense, to the quiescent pattern, wherein $F_0$ coupling, b, from the elements in transmitting antenna subarray to the elements in receiving antenna subarray is $$b = S_{BA} x, \quad (4)$$

where $S_{BA}$ is the scattering-matrix with the transmitting antenna subarray to receiving antenna subarray mutual coupling coefficients $S_{BA}$ is a P×Q matrix, where P and Q is the number of elements in receiving antenna subarray and transmitting antenna subarray respectively, wherein synthesis problem can then be stated as: find the approximate pattern $F_a$ such that the mean square difference $$\varepsilon(F_a) = \frac{d^2}{\lambda^2} \int_{-\frac{\lambda}{2d}}^{\frac{\lambda}{2d}} \int_{-\frac{\lambda}{2d}}^{\frac{\lambda}{2d}} |F_0(u, v) - F_a(u, v)|^2 \, dv \, du = \min, \quad (5)$$

subject to the constraint $$S_{BA} x_a = 0 \quad (6)$$

Parseval's identity on equation (5) gives $$\varepsilon(F_a) = \frac{d^2}{\lambda^2} \int_{-\frac{\lambda}{2d}}^{\frac{\lambda}{2d}} \int_{-\frac{\lambda}{2d}}^{\frac{\lambda}{2d}} |F_0(u, v) - F_a(u, v)|^2 \, dv \, du = \sum_m \sum_n |x_{0mn} - x_{amn}|^2 = (x_0 - x_a)^T (\bar{x}_0 - \bar{x}_a) = \|x_0 - x_a\|^2 = \varepsilon(x_a) \quad (7)$$

wherein the horizontal bar symbol denote complex conjugate, superscript T denotes transpose, wherein the synthesis problem now becomes $$\epsilon(x_a) = \|x_0 - x_a\|^2 = \min \quad (8)$$

$$g(x_a) = S_{BA} x_a = 0 \quad (9)$$

wherein the solution to this optimization problem is obtained by using "Lagrange's multipliers"

$$\frac{\partial}{\partial x_{ai}} \left( \varepsilon(x_a) + \sum_{j=1}^{P} \beta_j g_j(x_a) \right) = 0, \; i = 1 \ldots Q, \quad (10)$$

where β is a complex vector to be determined, wherein element index mn has for simplicity been replaced by the single index i, j is the receiving antenna subarray element index, wherein substitution of equation (8) and equation (9) in equation (10) gives $$\frac{\partial}{\partial x_{ai}} \left( (x_0 - x_a)^T (\bar{x}_0 - \bar{x}_a) + \sum_{j=1}^{P} \beta_j S_{BA,row\,j} x_a \right) = \frac{\partial}{\partial x_{ai}} \left( x_0^T \bar{x}_0 - x_0^T \bar{x}_a - x_a^T \bar{x}_0 + x_a^T \bar{x}_a + \sum_{j=1}^{P} \beta_j S_{BA,row\,j} x_a \right) = -\bar{x}_{0i} + \bar{x}_{ai} + \sum_{j=1}^{P} \beta_j S_{BA,ji} = -\bar{x}_{0i} + \bar{x}_{ai} + \beta^T S_{BA,column\,i} = 0 \Leftrightarrow -\bar{x}_0 + \bar{x}_a + (\beta^T S_{BA})^T = 0 \Leftrightarrow x_a = x_0 - S_{BA}^* \bar{\beta}, \quad (11)$$

where superscript * denote conjugate transpose $\bar{\beta}$ is determined from equation (9) and (11)

$$0 = S_{BA} x_a = S_{BA}(x_0 - S^*_{BA} \bar{\beta}) = S_{BA} x_0 - S_{BA} S^*_{BA} \bar{\beta} \Rightarrow$$

$$\bar{\beta} = (S_{BA} S^*_{BA})^{-1} S_{BA} x_0 \quad (12)$$

wherein substitution of equation (12) in equation (11) finally gives $$x_a = x_0 - S^*_{BA}(S_{BA} S^*_{BA})^{-1} S_{BA} x_0 = (I - S^*_{BA}(S_{BA} S^*_{BA})^{-1} S_{BA}) x_0, \quad (13)$$

where I is the identity matrix, wherein equation shows how to modify the quiescent excitation $x_0$ in the transmitting antenna subarray in order to get nulls at the elements in the receiving antenna subarray.

* * * * *